(12) United States Patent
Labonte et al.

(10) Patent No.: US 11,979,323 B2
(45) Date of Patent: May 7, 2024

(54) SYSTEM AND METHOD FOR PROGRAMMING PACKET FORWARDING HARDWARE

(71) Applicant: Arista Networks, Inc., Santa Clara, CA (US)

(72) Inventors: Francois Labonte, Menlo Park, CA (US); Muhammad Khalid Yousuf, Milpitas, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 17/340,583

(22) Filed: Jun. 7, 2021

(65) Prior Publication Data

US 2022/0393979 A1 Dec. 8, 2022

(51) Int. Cl.
*H04L 45/745* (2022.01)
*H04L 41/00* (2022.01)
*H04L 45/00* (2022.01)

(52) U.S. Cl.
CPC ............ *H04L 45/745* (2013.01); *H04L 41/24* (2013.01); *H04L 45/56* (2013.01)

(58) Field of Classification Search
CPC ........ H04L 45/745; H04L 41/24; H04L 45/56
See application file for complete search history.

(56) References Cited

U.S. PATENT DOCUMENTS

| 7,324,514 B1* | 1/2008 | Haq | H04L 12/66 370/395.32 |
| 10,708,272 B1* | 7/2020 | Holbrook | H04L 9/0643 |
| 10,778,721 B1* | 9/2020 | Holbrook | H04L 63/20 |
| 2006/0233173 A1* | 10/2006 | Pullela | H04L 12/4641 370/392 |
| 2013/0301641 A1* | 11/2013 | Anand | H04L 63/0227 370/389 |

OTHER PUBLICATIONS

Tony Watson, (Last updated May 5, 2010). "Capirca Design Doc", Multi-platform ACL generation system. https://github.com/google/capirca/ (8 pages).

* cited by examiner

*Primary Examiner* — Oleg Survillo
*Assistant Examiner* — Monishwar Mohan
(74) *Attorney, Agent, or Firm* — Sprinkle IP Law Group

(57) ABSTRACT

A switching system manager programmed to obtain a base lookup data structure comprising nodes that enumerate all prefixes of a first traffic management policy of a first type and all prefixes of a second traffic management policy of a second type, modify the base lookup data structure based on a first set of inheritance rules associated with the first traffic management policy to generate an updated lookup data structure comprising first traffic management policy label allocations, modify the updated lookup data structure based on a second set of inheritance rules associated with the second traffic management policy to generate a combined lookup data structure comprising the first traffic management policy label allocations and second traffic management policy label allocations, program packet classification hardware of the switching system to adapt the switching system to process packets based on the combined lookup data structure.

20 Claims, 22 Drawing Sheets

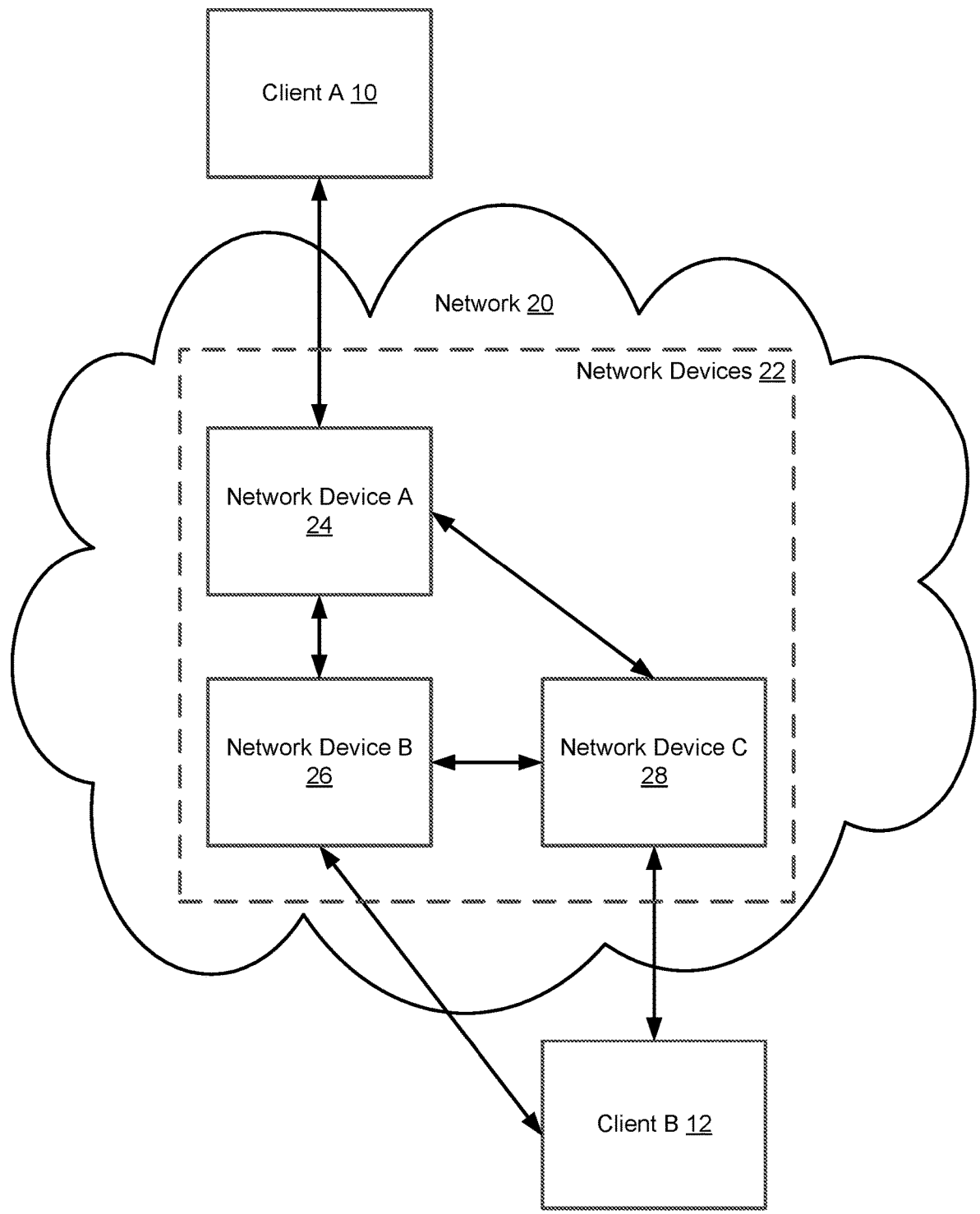
FIG. 1.1

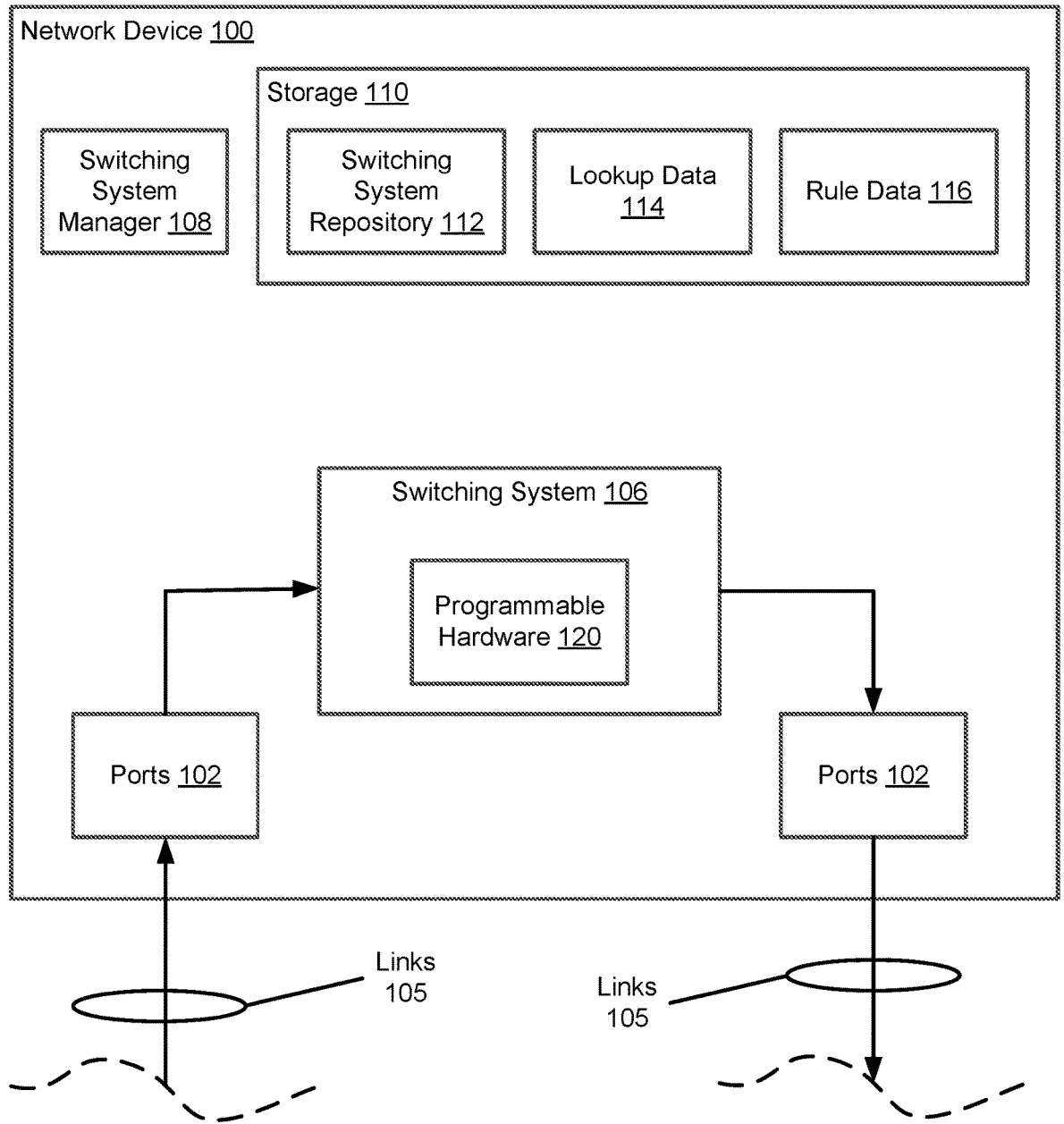
FIG. 1.2

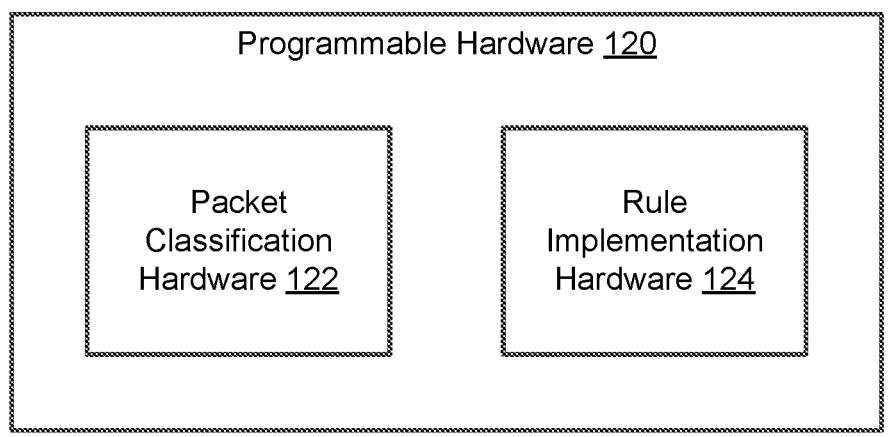
FIG. 1.3

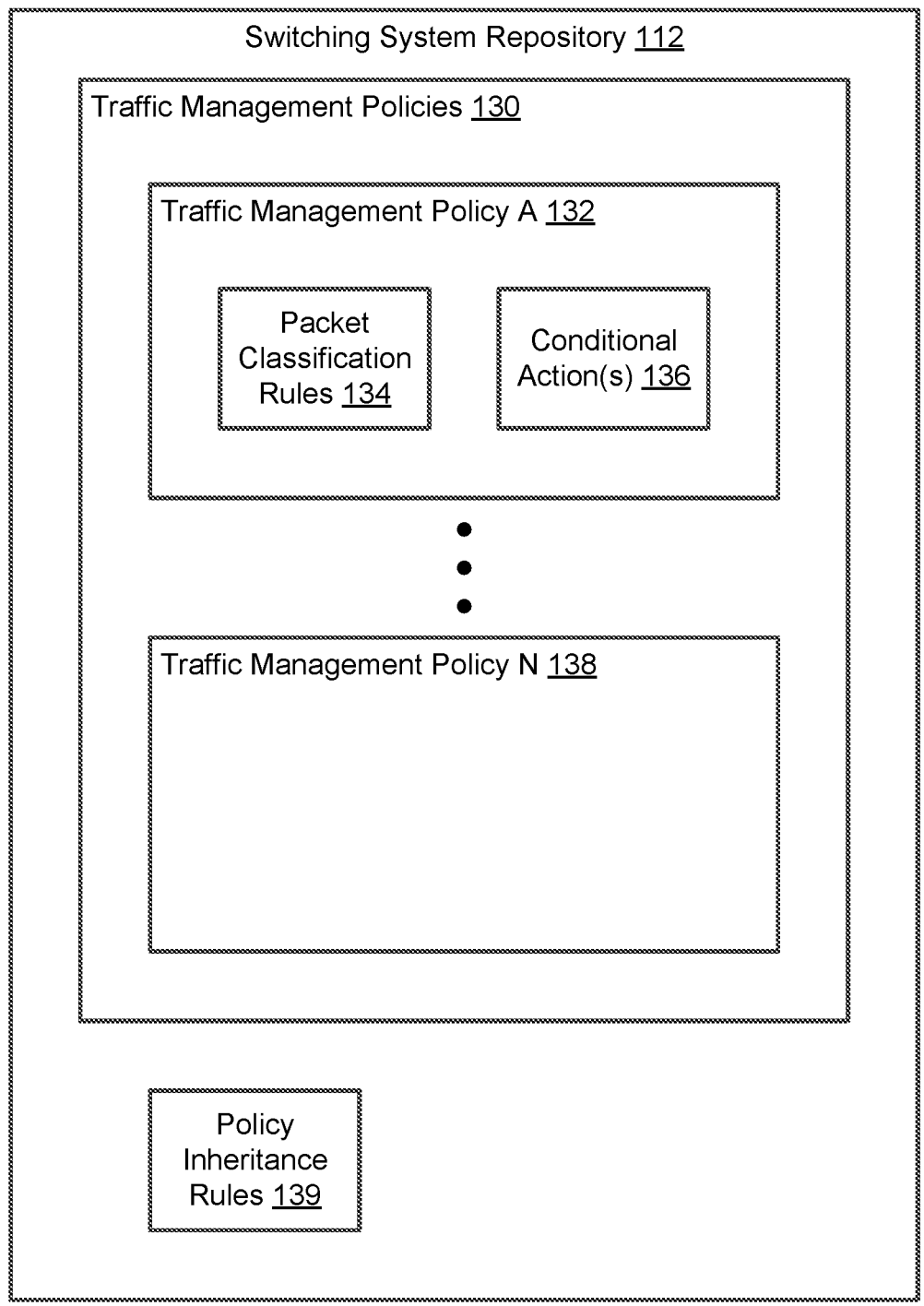
FIG. 1.4

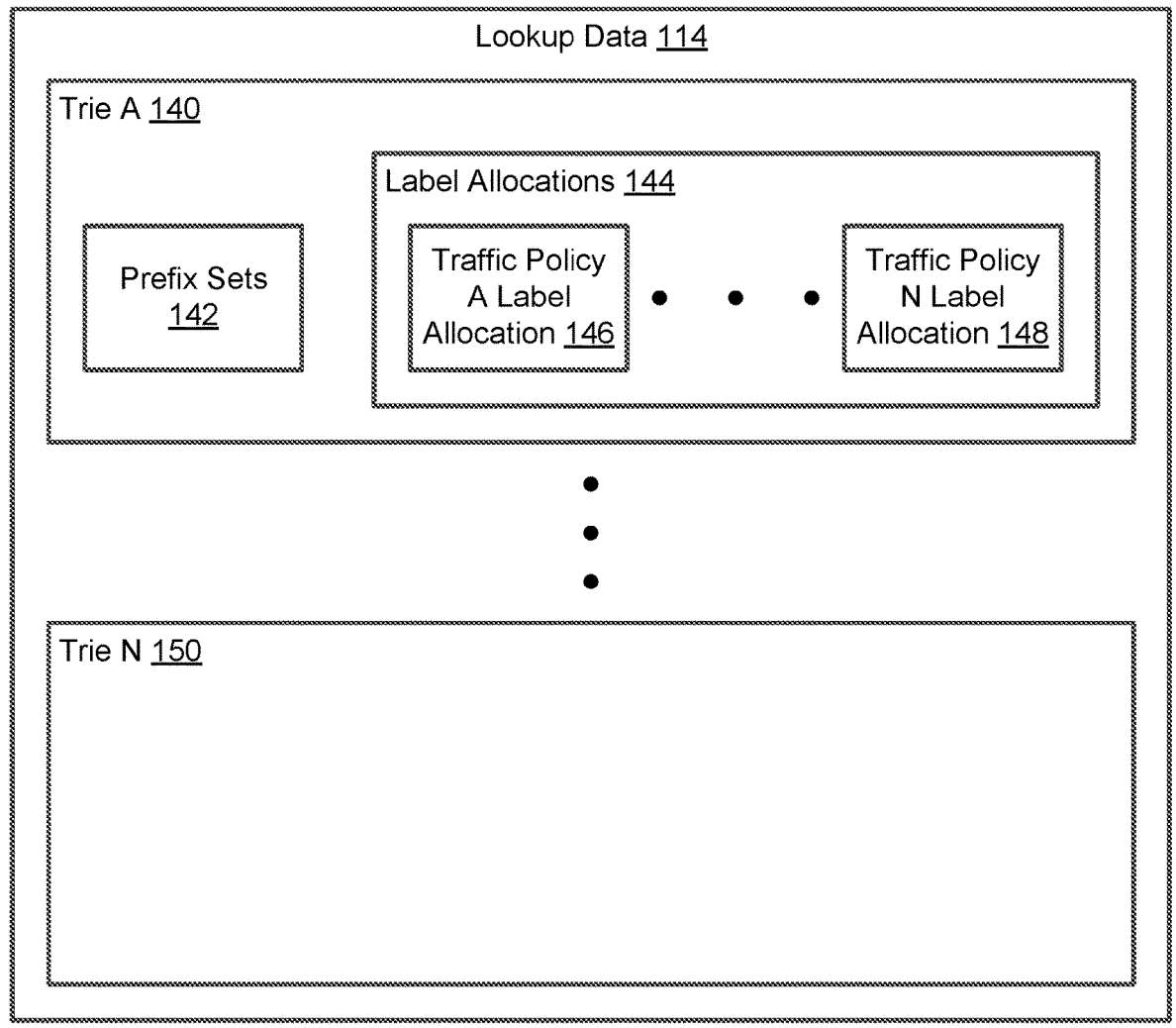
FIG. 1.5

Packet Classification Rules 400

First Classification Rule 402

Condition:
10.1.0.0/16 except 10.1.0.0/24
&
Member of First Virtual Routing
and Forwarding (VRF) Group
404

Classification:
First Type
406

Second Classification Rule 408

Condition:
10.0.0.0/8
&
Member of First VRF Group
410

Classification:
Second Type
412

Third Classification Rule 414

Condition:
10.0.0.0/9
&
Member of Second VRF Group
416

Classification:
Third Type
418

FIG. 4.1

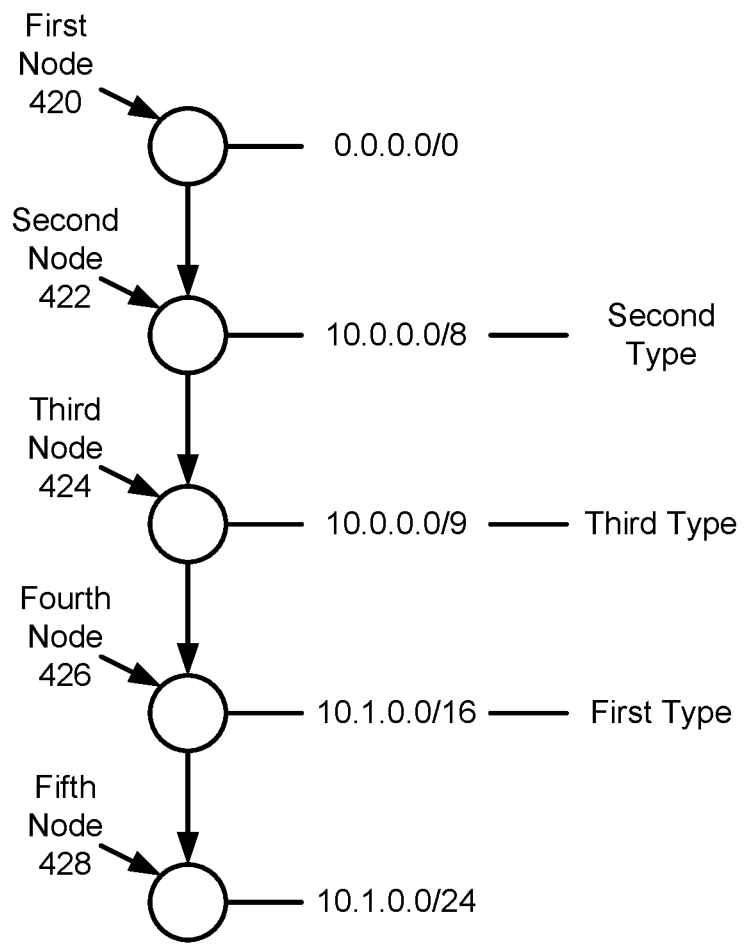
FIG. 4.2

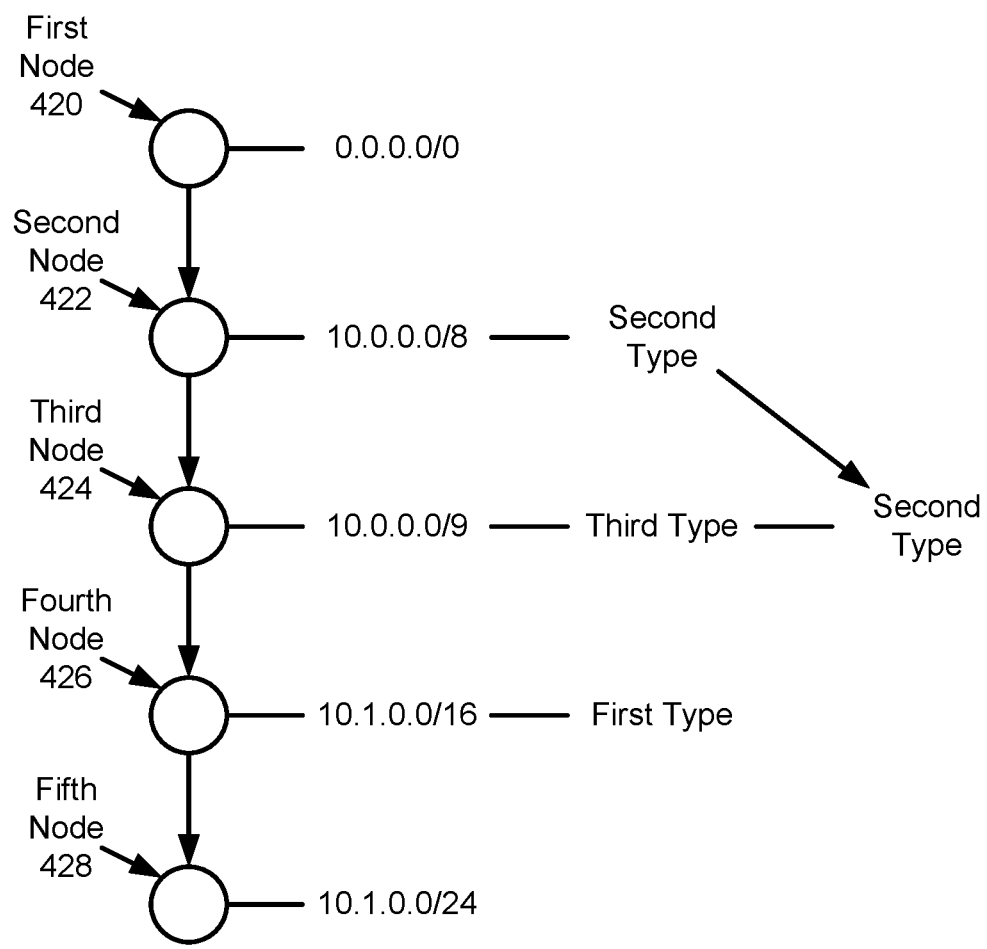
FIG. 4.3

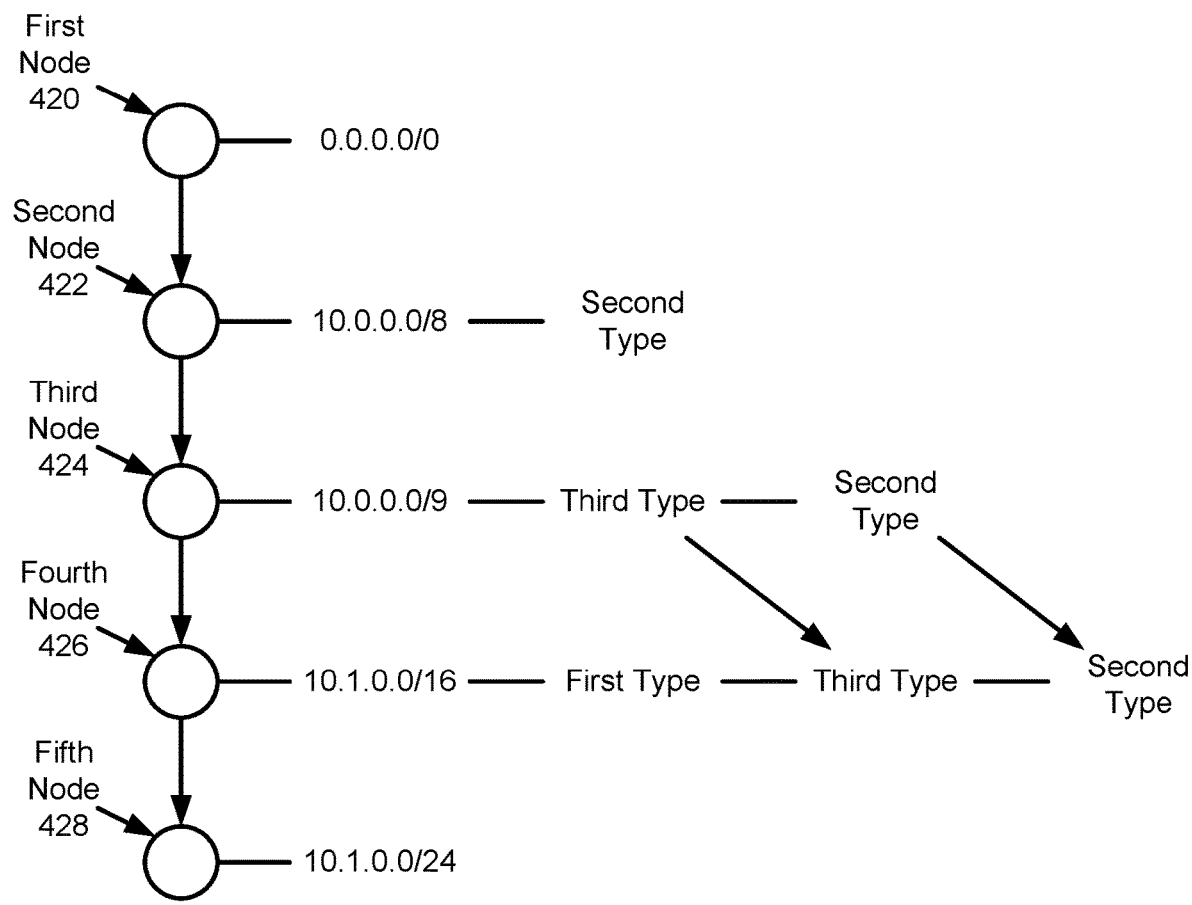
FIG. 4.4

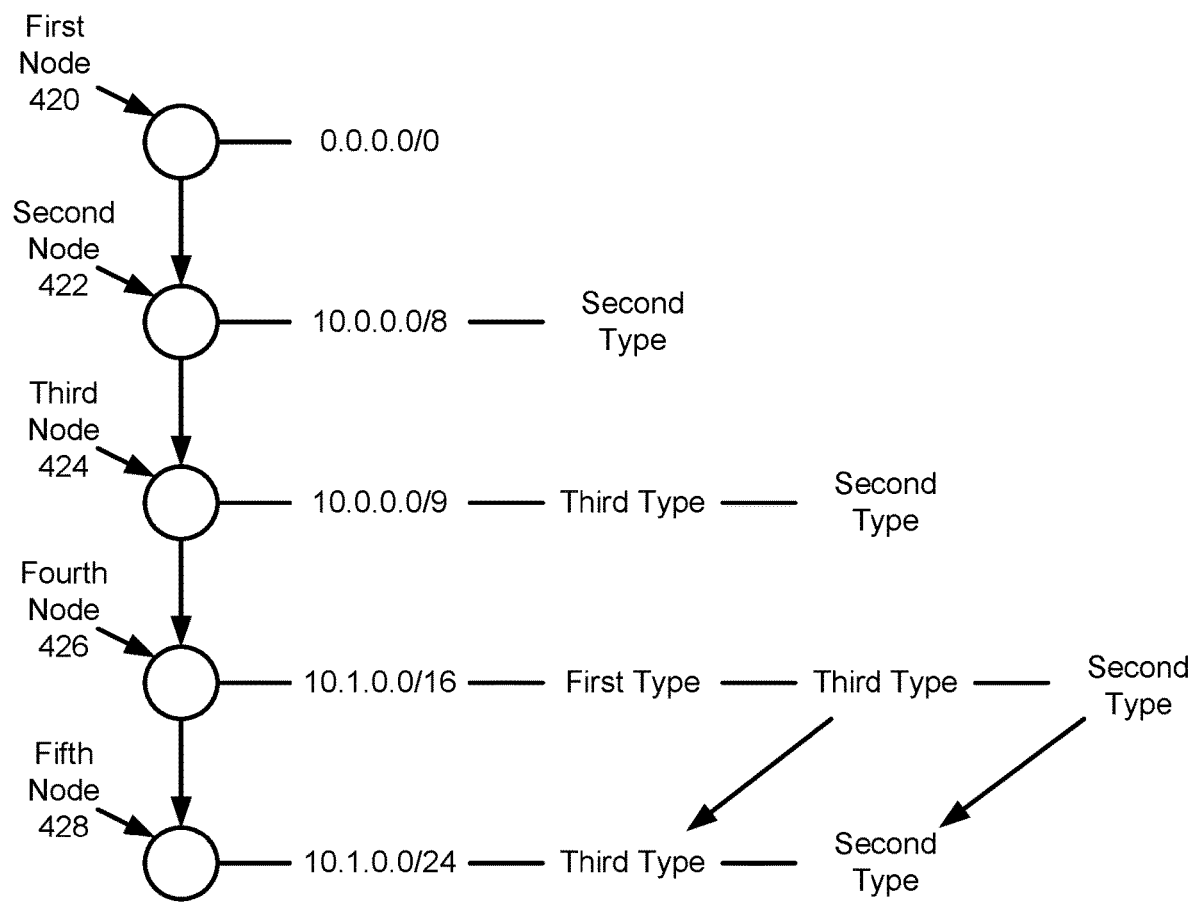
FIG. 4.5

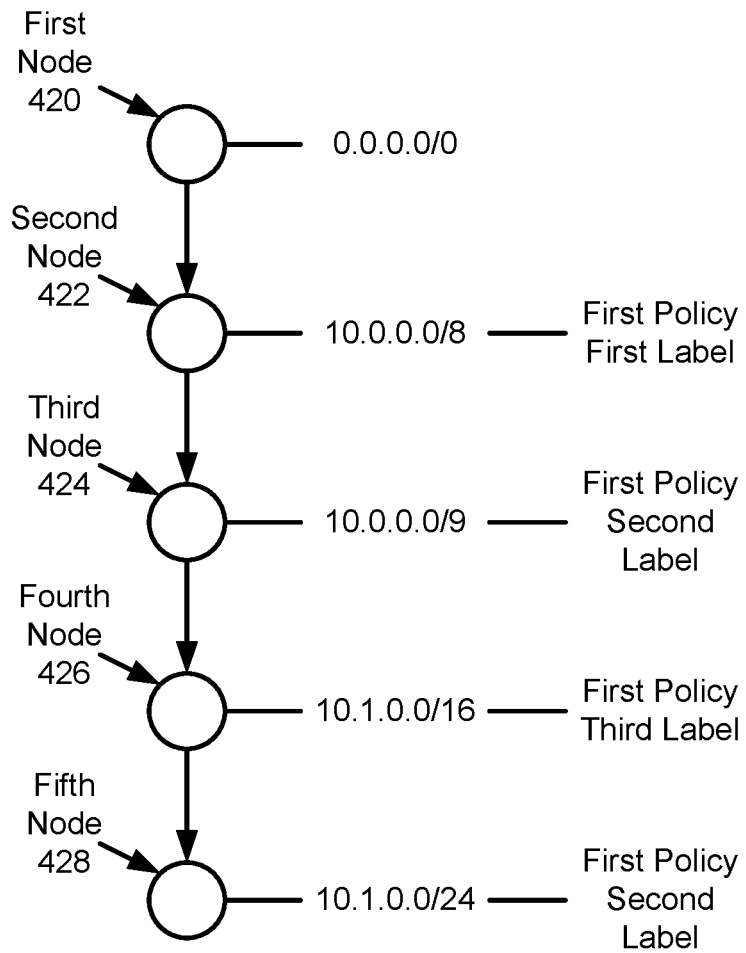
FIG. 4.6

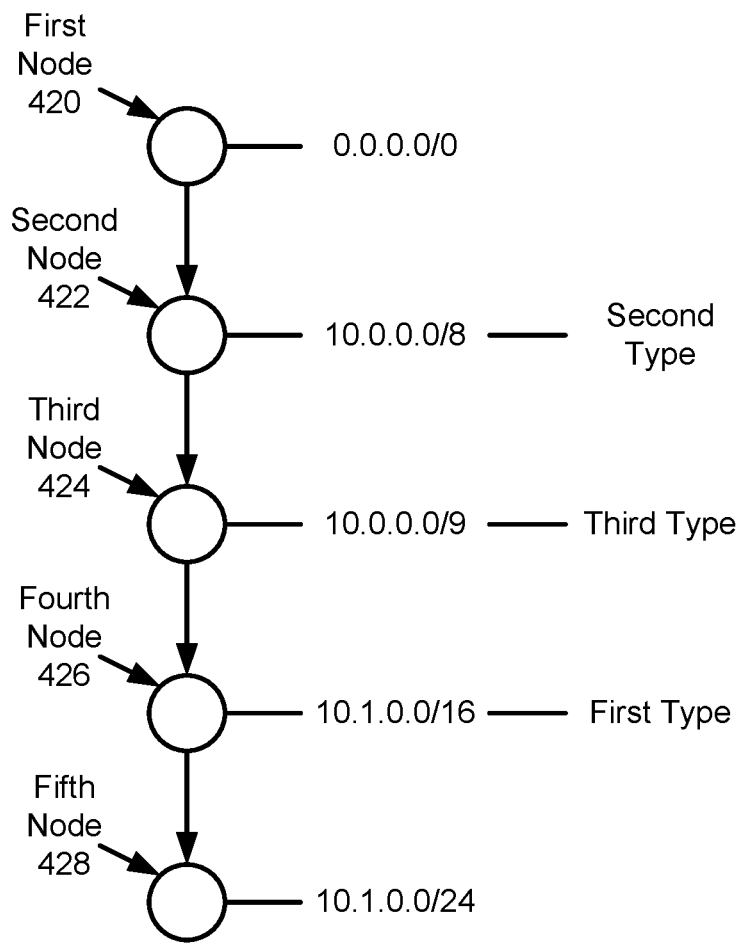
FIG. 4.7

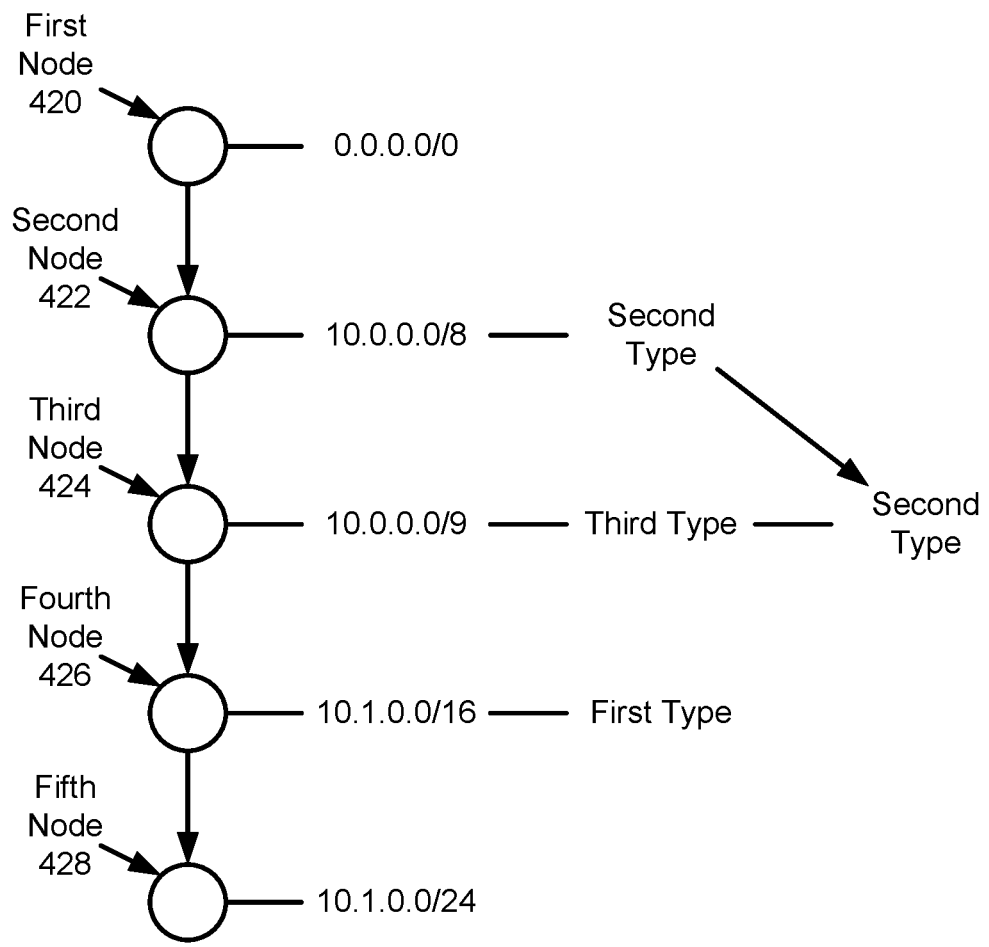
FIG. 4.8

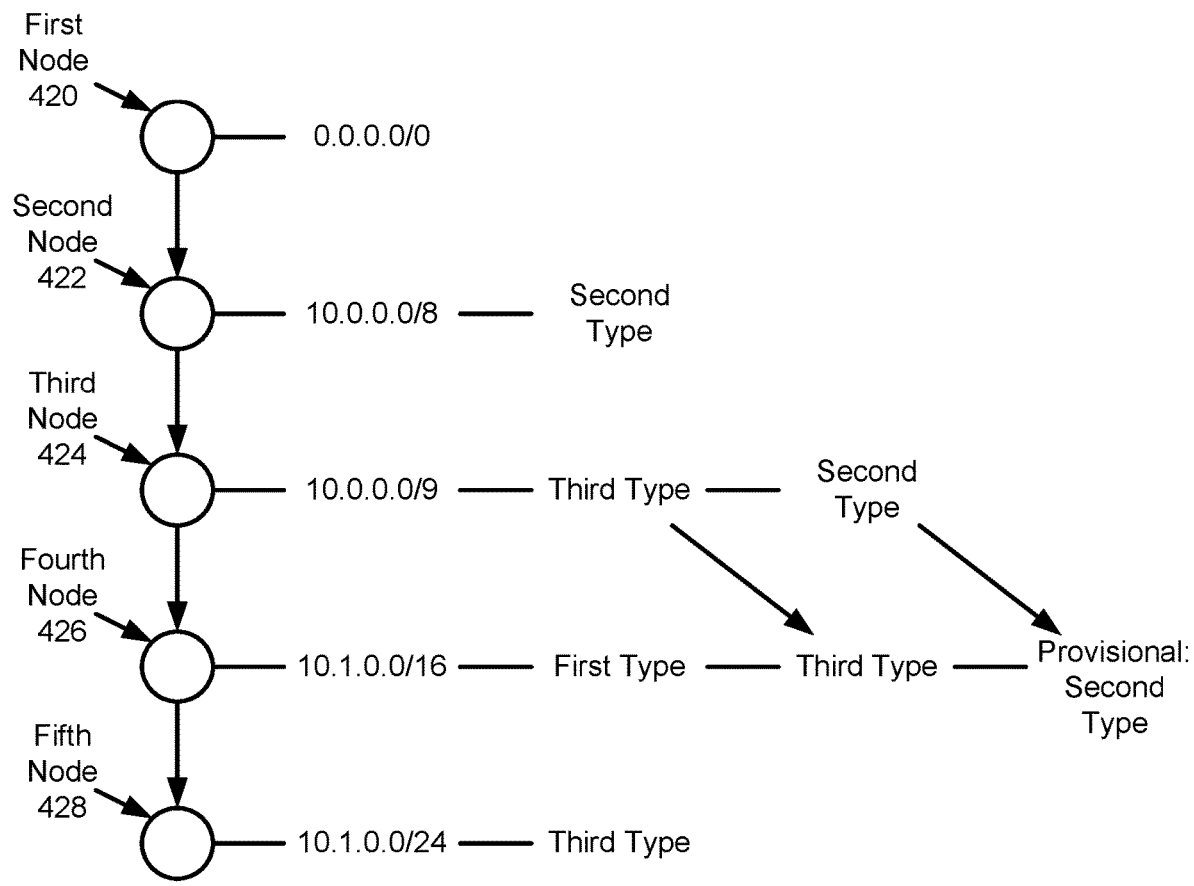
FIG. 4.9

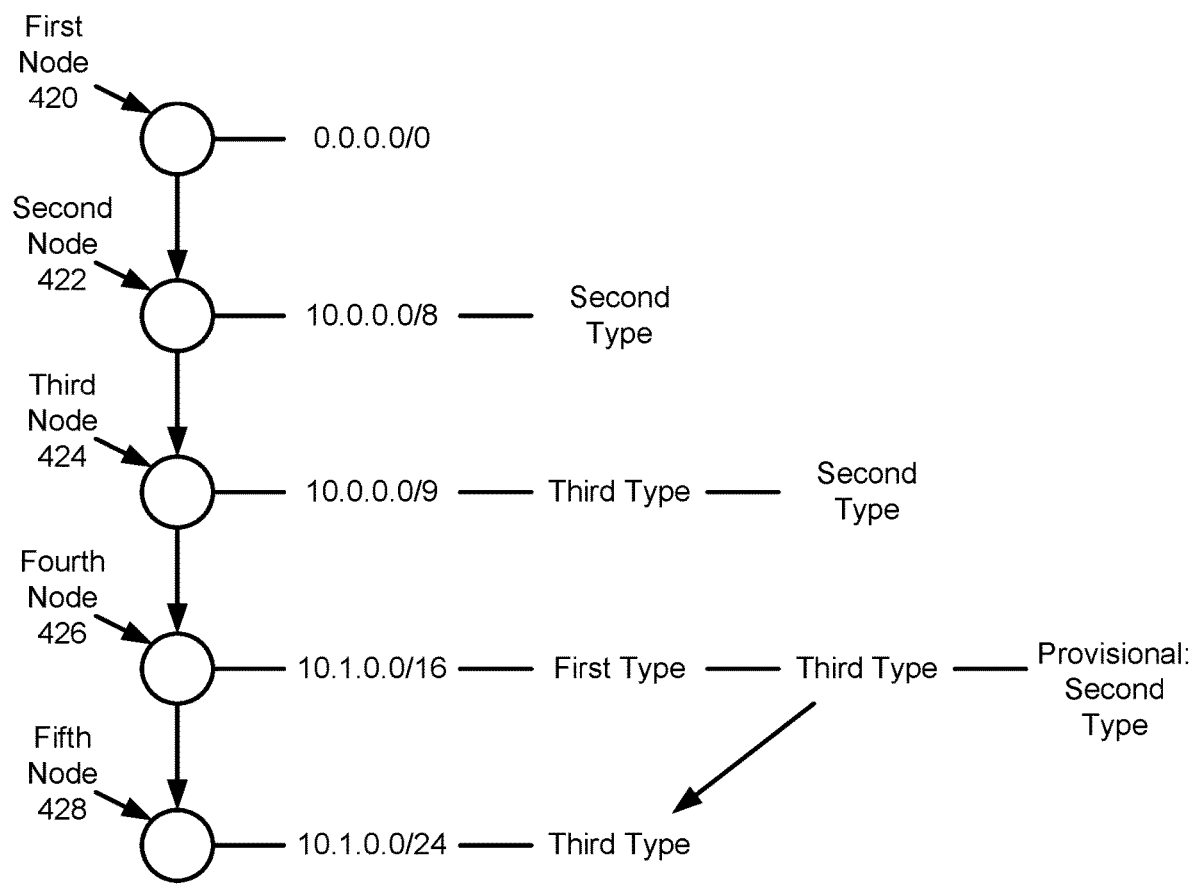
FIG. 4.10

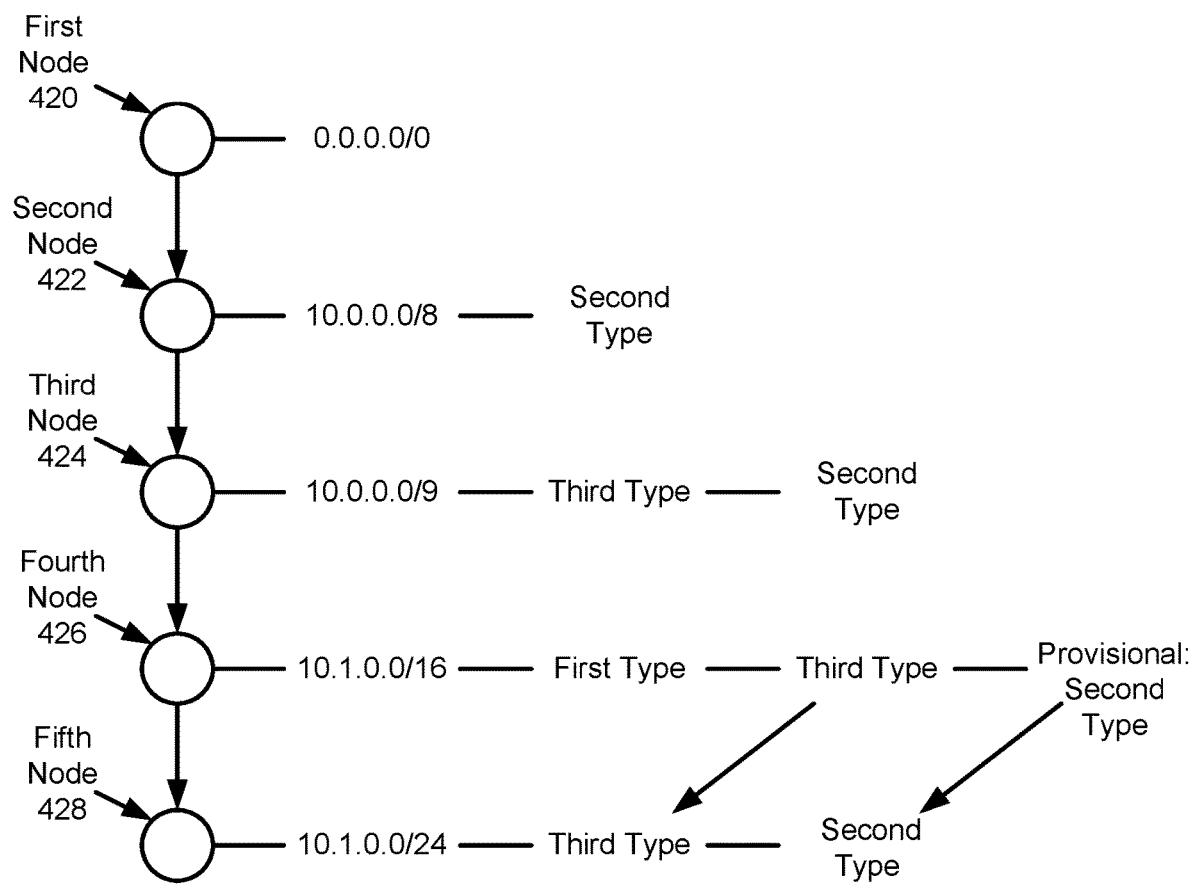
FIG. 4.11

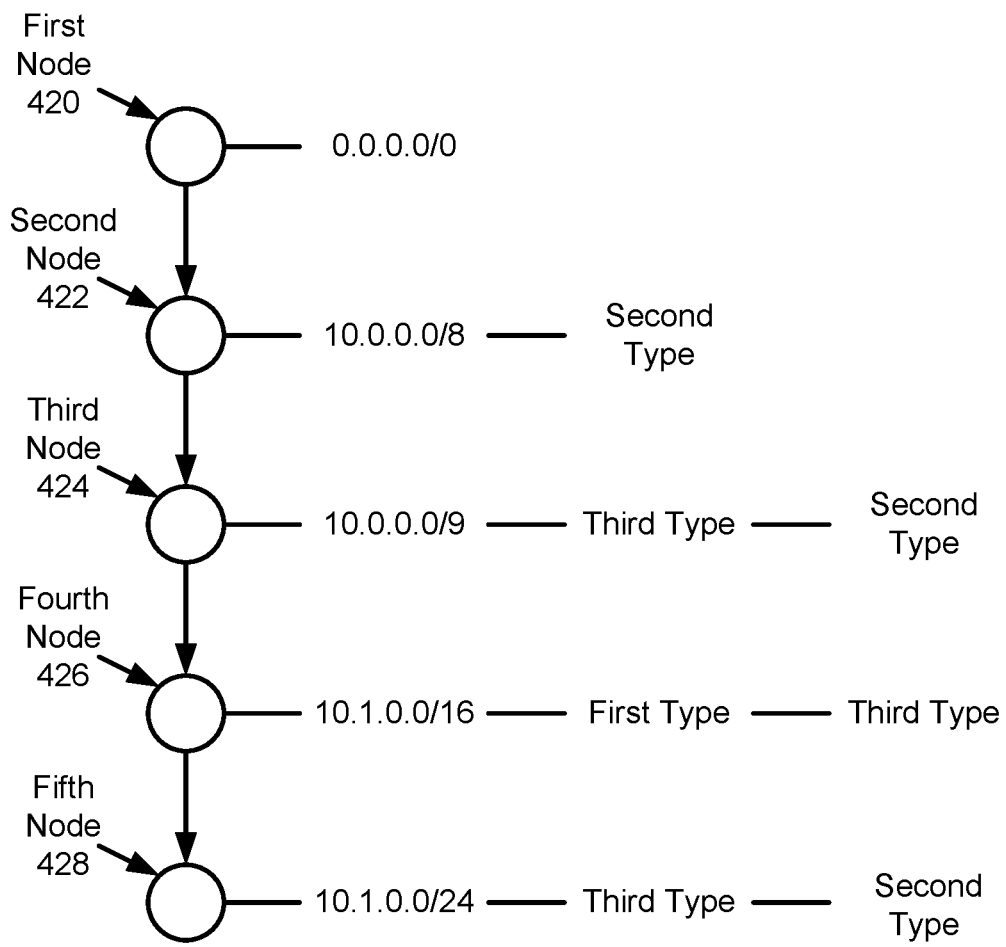
FIG. 4.12

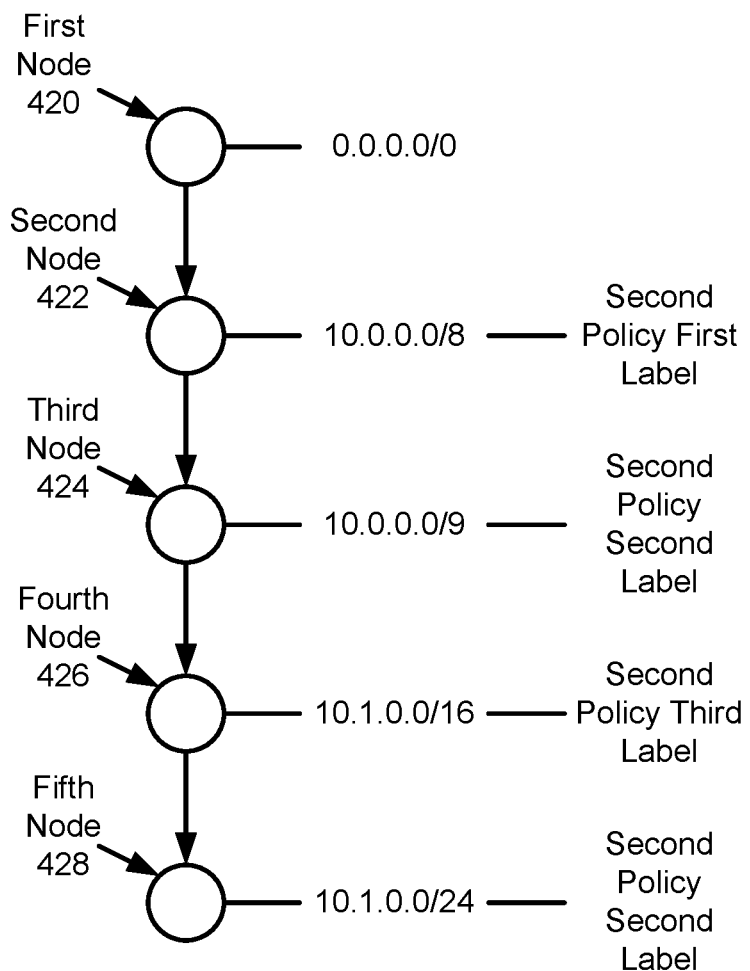
FIG. 4.13

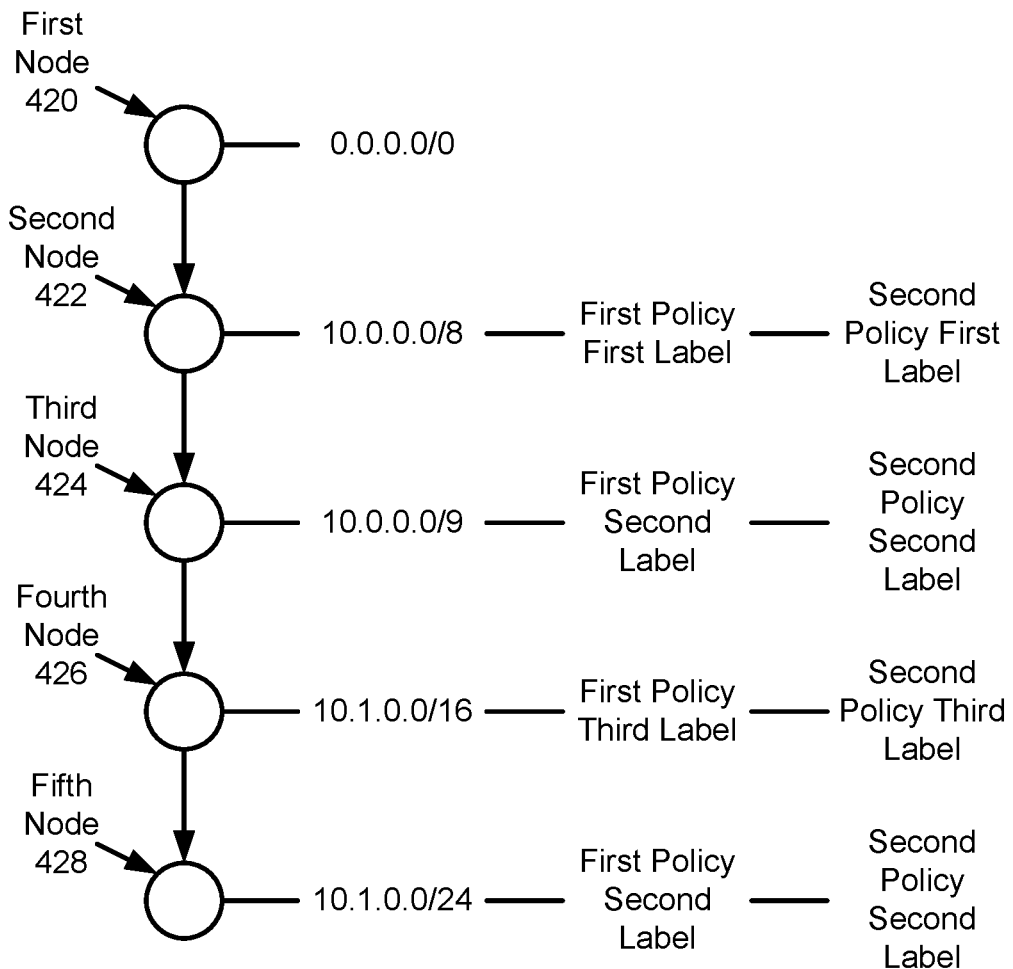
FIG. 4.14

SYSTEM AND METHOD FOR PROGRAMMING PACKET FORWARDING HARDWARE

BACKGROUND

Multiple devices may communicate with each other to provide their respective functionalities. For example, the devices may send data representing information used by the devices to provide their functionalities.

BRIEF DESCRIPTION OF DRAWINGS

Certain embodiments will be described with reference to the accompanying drawings. However, the accompanying drawings illustrate only certain aspects or implementations of the disclosed embodiments by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 1.3 shows a diagram of programmable hardware in accordance with one or more embodiments disclosed herein.

FIG. 1.4 shows a diagram of a switching system repository in accordance with one or more embodiments disclosed herein.

FIG. 1.5 shows a diagram of lookup data in accordance with one or more embodiments disclosed herein.

FIGS. 4.1-4.14 show diagrams of data structures and/or illustrate a process of generating the data structures by an example system over time in accordance with one or more embodiments disclosed herein.

DETAILED DESCRIPTION

Figure 2:
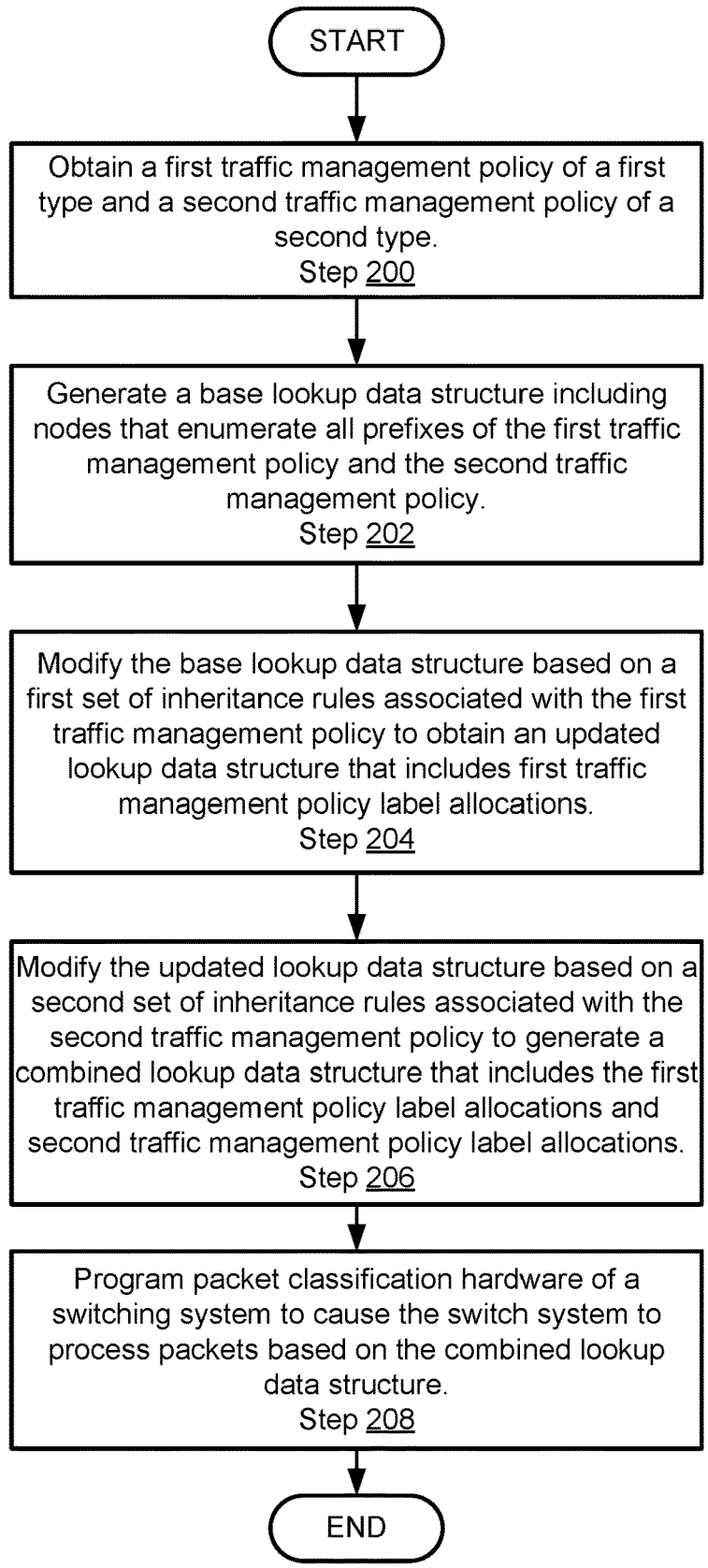
FIG. 2 shows a flowchart of a method of programming a switching system in accordance with one or more embodiments disclosed herein.

Networks may include devices (e.g., network devices, clients, etc.) that generate, send, receive, and/or forward packets. A packet may be a data structure that includes one or more portions that include data (e.g., a payload) to be transmitted using the packet and one or more portions (e.g., control information) that include information that may be used to determine where to send the packet.

When a network device receives a packet, it may need to ascertain how to respond to the packet. For traffic management purposes, security purposes, and for other reasons, network devices may need to respond differently when it receives different packets. To decide how to respond to packets, the network device may examine the control information in the packet (and/or other information regarding the packet) to determine how to respond to the packet.

To efficiently determine how to respond to packets, network devices may utilize programmable hardware (e.g., packet processors) that is adapted to efficiently process packets. The programmable hardware may implement a pipeline or other type of packet processing engine, in hardware, that is able to identify how the network device should respond to the packet. The processing performed by the pipeline or other type of packet processing engine may be configurable by programming the programmable hardware.

The programmable hardware may include a finite quantity of resources for processing packets. Consequently, inefficient use of these resources may reduce the efficiency of packet processing by the network device and/or limit the complexity of packet processing by the programmable hardware.

Embodiments disclosed herein may provide systems and methods for improving the packet processing efficiency of programmable hardware. The packet processing efficiency of the programmable hardware may be improved by implementing a packet processing model that includes a classification stage.

In the packet classification stage, packets are classified based on a data structure that is able to provide multiple classifications for different traffic management policies using a single lookup. After the packet classification stage, actions to be performed by the network device are identified based on the classifications.

For example, when a packet is received, it may be classified for both segment security and routing purposes using a single lookup. The segment security classification may then be used to identify whether, for example, the packet should be forwarded or dropped. The routing classification may be used to, for example, forward multiple copies of the packet to multiple devices or take other action.

By enabling multiple classifications to be obtained via a single lookup, the rate of packet processing by the network device may be increased when compared to performing multiple lookups to obtain different classifications. Additionally, the quantity of resources utilized for programming the data structure may be reduced when compared to the quantity of resources required to program multiple, separate data structures that may be used to perform separate lookups. Consequently, the efficiency of resource use may be improved and/or more complicated or additional processing of packets may be enabled.

In the text that follows, a description of components of a system in accordance with embodiments disclosed herein is provided with respect to FIGS. 1.1-1.3. A description of data structures that may be used by the system of FIG. 1.1 is provided with respect to FIGS. 1.4-1.5.

Figure 3:
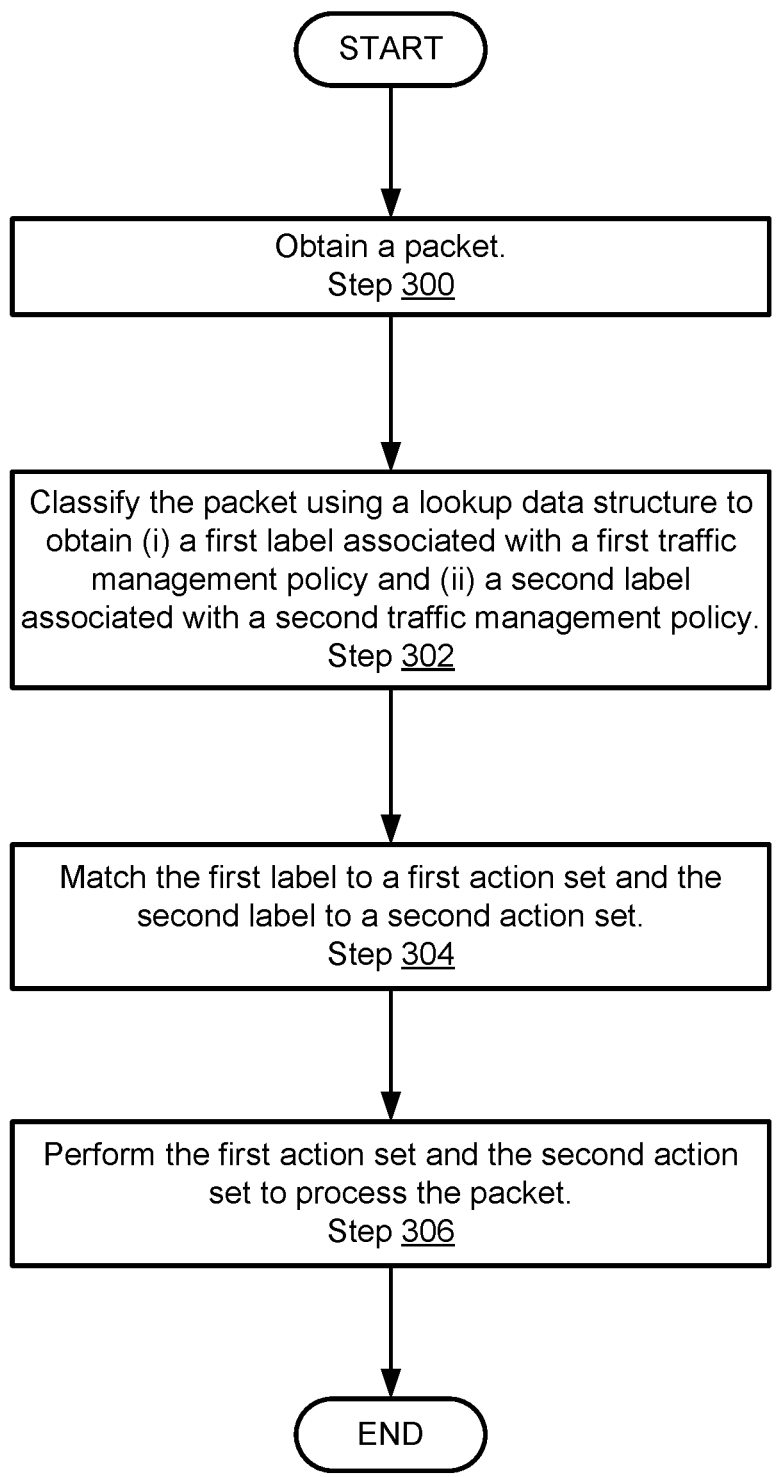
FIG. 3 shows a flowchart of a method of processing packets in accordance with one or more embodiments disclosed herein.

Following the description of the data structures, a description of methods that may be performed by components of the system of FIG. 1.1 is provided with respect to FIGS. 2-3. An example illustrating generation of data structures that may be used to classify packets is provided in FIGS. 4.1-4.14. Lastly, a description of a computing device that may be used to implement the system of FIG. 1.1 is provided with respect to FIG. 5.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

FIG. 1.1 shows a diagram of an example system in accordance with one or more embodiments described herein. The system may include clients (e.g., 10, 12) that utilize services provided by network (20). The services provided by the network (20) may include, for example, packet forwarding services for packets transmitted by clients (e.g., 10, 12) and other devices (not shown). By forwarding packets, network (20) may enable clients (e.g., 10, 12) and/or other devices to communicate with any number of devices operably connected to network (20). While described throughout with respect to packets (and packet switched networks), embodiments disclosed herein may be implemented with respect to other types of data structures used in various types of networks. Additionally, while network (20) is illustrated as including a specific number of devices in a particular connectivity arrangement, network (20) may include different numbers and/or types of devices having different connectivity arrangements.

To forward packets, network (20) may include network devices (22). Network devices (22) may be physical devices operably connected to any number of other devices (e.g., other network devices, clients (e.g., 10, 12), and/or other devices). Network devices (22) may make packet forward decisions in a manner that causes packets to be routed from sending devices to destination devices. Network devices (22) may include any number of network devices and other types of devices. Network devices (22) may be implemented to provide switching, routing, and/or other types of network functionality.

Network devices (22) may include functionality to (i) forward packets, (ii) obtain information regarding the network environment in which network devices (22) reside, and (iii) use the obtained information regarding the network environment to decide how to forward the packets. To enable network devices (22) to efficiently forward packets, network devices (22) may include programmable hardware that is able to quickly ascertain how to forward the packets and/or whether to perform any number of actions based on the packets. Network devices (22) may program the programmable hardware using the obtained information regarding the network environment, traffic management policies keyed to the packets (e.g., keyed to various portions of control information of the packets), and/or other information.

The programmable hardware used by network devices (22) to forward packets may include a finite quantity of resources for making packet forwarding decisions. For example, the programmable hardware may only be able to implement a finite number of rules for deciding how to respond (e.g., forward, drop, and/or perform other actions) to received packets.

Embodiments disclosed herein may provide network devices that are able to make packet forwarding decisions based on a larger number of traffic management policies and/or more complex traffic management policies. To do so, lookup data structures (e.g., the combined lookup data structure) that are able to classify packets for multiple traffic management policies (e.g., different types of traffic management policies) may be obtained. The programmable hardware of network devices (22) may be programmed using the lookup data structures and rules keyed to the classifications provided by the lookup data structures.

When a packet is received by one of network devices (22), the programmable hardware may perform a single lookup that returns classifications for different traffic management policies. The programmable hardware may use the classifications to perform rule lookups to identify actions to be performed based on the received packet. The network device that received the packet may perform the identified actions.

By programming the programmable hardware, as discussed above, network devices (22) may more efficiently process packets by performing a single lookup (as opposed to multiple lookups) for packet classification purposes. Similarly, the quantity of resources required for programming the lookup data structures may be reduced when compared to programming the programmable hardware using multiple lookup data structures. Accordingly, the limited resources of the programmable hardware may be programmed to implement a larger number of and/or more complex traffic management policies by virtue of the reduced quantity of resources utilized for programming traffic management policies.

Any of the components of FIG. 1.1 may be operably connected by any combination and/or number of wired and/or wireless connections. Network (20) is illustrated in FIG. 1.1 as including a specific number and arrangement of network devices for explanatory purposes only. For example, in FIG. 1.1, operable connections are illustrated using lines terminated in arrows. While illustrated as including a specific number and arrangement of these operable connections, network (20) may include different numbers and arrangements of operable connections without departing from embodiments disclosed herein.

As discussed above, the system of FIG. 1.1 may include network devices (e.g., 24, 26, 28) that may provide packet forwarding services. Any of the devices of FIG. 1.1 may be implemented using computing devices. The computing devices may include, for example, mobile phones, tablet computers, laptop computers, desktop computers, servers, switches, and/or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing devices to perform the functions described in this application and/or all, or a portion, of the methods illustrated in FIGS. 2-3. The devices of FIG. 1.1 may be implemented using other types of computing devices without departing from the embodiments disclosed herein. For additional details regarding computing devices, refer to FIG. 5.

The devices of FIG. 1.1 may be implemented using logical devices without departing from the embodiments disclosed herein. For example, the devices of FIG. 1.1 may be implemented using virtual machines (or other types of logical entities) that utilize computing resources (e.g., provided by hardware devices) of any number of physical computing devices to provide their respective functionalities. Thus, a logical entity may be an entity that, for example, shares various hardware devices when providing its functionality. The devices of FIG. 1.1 may be implemented using other types of logical devices without departing from the embodiments disclosed herein.

In one or more embodiments disclosed herein, network devices (22) are implemented as switching devices such as switches, multilevel switches, routers, etc. A switching device may be a device that is adapted to facilitate network communications by, for example, forwarding packets or other types of data structures. A switching device may include a computing device.

While the system of FIG. 1.1 has been illustrated and described as including a limited number of specific components, a system in accordance with embodiments disclosed herein may include additional, fewer, and/or different components than those illustrated and described.

To further clarify aspects of network devices, a diagram of network device (100) is provided in FIG. 1.2. Any of the network devices of FIG. 1.1 may be similar to network device (100) illustrated in FIG. 1.2.

FIG. 1.2 shows a logical diagram of network device (100) in accordance with one or more embodiments described herein. Network device (100) may facilitate network communications. To do so, network device (100) may provide any number of functionalities, including packet forwarding functionality. Packet forwarding functionality may include (i) programming hardware devices (e.g., packet processors) which may be used to forward packets, (ii) obtaining information regarding the network environment in which network device (100) resides and through which packets may traverse, and (iii) forwarding packets using the hardware devices.

To provide packet forwarding functionality, network device (100) may include ports (102), switching system (106) that switches packets between ports (102), switching system manager (108) that manages the operation of switching system (106), and/or data structures stored in storage (110) maintained by switching system manager (108). Each of these components of network device (100) is discussed below.

Ports (102) may facilitate obtaining packets from other devices. For example, ports (102) may be adapted to operably connect to other devices (e.g., may receive cabling to another device). Ports (102) may obtain packets from other devices via the operable connections. Ports (102) may be associated with corresponding communication endpoints.

Ports (102) may also facilitate providing of packets to other devices. Ports (102) may provide the packets to other devices via the operable connections facilitated by ports (102).

Switching system (106) may forward packets obtained via the ports (102) to other devices via the ports (102). For example, switching system (106) may direct packets received via one of ports (102) towards another of ports (102). Each of these ports may be operably connected to other devices. Consequently, switching the packets between these ports may cause the packets to be transmitted from a first device to a second device operably connected by the ports. Switching system (106) may selectively direct (e.g., switch) the packets in a manner that facilitates controlling the flow of packets across the network illustrated in FIG. 1.1.

For example, if a packet is transmitted by client A (10, FIG. 1.1) towards client B (12, FIG. 1.1), there may be multiple paths that the packet may take through network devices (22, FIG. 1.1) to reach client B (12). A switching system of any of network devices (22, FIG. 1.1) may be programmed to, for example, direct the packet toward client B (12) using an efficient path (e.g., lower latency), direct the packet toward client B (12) using a less used path to distribute packets across the network devices of network (20, FIG. 1.1.), and/or for other purposes.

In addition to and/or alternatively to forwarding packets, switching system (106) may perform other actions in response to received packets. These actions may include, for example, dropping packets, modifying control information of packets, notifying other entities (e.g., applications hosted by network device (100), other devices, etc.) of the arrival of packets, and/or performing any number and/or type of functionality.

Switching system (106) may be programmable. How switching system (106) is programmed may determine how network device (100) responds to packets. For example, switching system (106) may receive data and make decisions regarding how to forward packets based on the data, the packets, and/or one or more algorithms for making switching decisions.

Switching system (106) may include programmable hardware (120). Programmable hardware (120) may be a portion of a packet processor or other device capable of operating a packet processing pipeline (or other type of system for managing packets). Programmable hardware (120) may implement a packet processing pipeline that may be modified based on its programming. In other words, the response of switching system (106) to received packets may be modified by changing the programming of programmable hardware (120). The packet processing pipeline may include any number of steps of packet classification and identifying actions to be performed based on the packet classifications.

For example, when a packet is received by network device (100), control information and/or the payload included in the packet may be subjected to processing via the pipeline implemented by switching system (106). The packet may first be classified and given one or more corresponding labels or other indicators associated with its classification(s). The label and/or other information (e.g., portions of the control information) may then be used to identify actions to be performed using, at least in part, the label(s).

Programmable hardware (120) may include a limited quantity of resources that may be programmed. For example, programmable hardware (120) may only be capable of implementing a predetermined number of lookup data structures (e.g., the combined lookup data structure) for packet classification purposes, a predetermined number of actions keyed (at least in part) the classifications implemented in the lookup data structures, etc. As will be discussed in greater detail below, switching system manager (108) may program programmable hardware (120) in a manner that may (i) improve the efficiency of the use of resources of programmable hardware (120) and/or (ii) may enable more complex packet classifications and/or response to those classifications to be programmed in to programmable hardware (120).

Programmable hardware (120) may perform all, or a portion, of the method illustrated in FIG. 3 as part of providing its functionality. For additional details regarding programmable hardware (120), refer to FIG. 1.4.

Switching system manager (108) may program programmable hardware (120). Once programmed, switching system (106) may initiate performance of actions based on the programming of programmable hardware (120).

Switching system manager (108) may manage the operation of switching system (106). Switching system manager (108) may manage the operation of switching system (106) by (i) programming and/or (ii) reprogramming programmable hardware (120) of switching system (106). By doing so, switching system manager (108) may change the forwarding behavior and/or other response behavior of network device (100) to received packets.

To manage the operation of switching system (106), switching system manager (108) may (i) monitor the operation of switching system (106), (ii) obtain information regarding the network environment in which network device (100) resides, (iii) obtain information regarding changes in traffic management policies, and/or (iv) determine how to modify the operation of switching system (106) (e.g., by reprogramming/programming packet processors) based on the information obtained by switching system manager (108).

Switching system manager (108) may store information which it uses to program programmable hardware (120) in switching system repository (112). Switching system manager (108) may obtain lookup data (114) and/or rule data (116) using the information included in switching system repository (112). Lookup data (114) and rule data (116) may be data structure that may be usable to program programmable hardware (120).

Lookup data (114) may include any number of data structures that include information that may be used to classify packets. As noted above, packet classifications may be used to identify actions to be performed by network device (100).

Rule data (116) may include any number of data structures that include information that may be used to identify actions to be performed by network device (100). The rule data (116) may specify actions to be performed for corresponding packet classifications.

Switching system manager (108) may generate and/or modify lookup data (114) and/or rule data (116). Switching system manager (108) may do so, for example, in response to changes in switching system repository (112), at predetermined point in time, and/or in response to the occurrence of predetermined events.

Switching system manager (108) may program programmable hardware (120) by modifying any number of registers, table, and/or other data storage elements of programmable hardware (120) based on lookup data (114), rule data (116), and/or other data structures. Switching system manager (108) may perform other types of actions to program programmable hardware (120) without departing from embodiments disclosed herein. Switching system manager (108) may program programmable hardware (120), for example, in response to changes in switching system repository (112), at predetermined point in time, and/or in response to the occurrence of predetermined events.

In one or more embodiments disclosed herein, switching system manager (108) is implemented using a hardware device including circuitry. Switching system manager (108) may include, for example, a digital signal processor, a field programmable gate array, and/or an application specific integrated circuit. The circuitry of the hardware devices may be adapted to provide the functionality of switching system manager (108). Switching system manager (108) may be implemented using other types of hardware devices without departing from embodiments disclosed herein.

In one or more embodiments disclosed herein, switching system manager (108) is implemented using computing code stored on a persistent storage that when executed on a processor causes the processor to perform the functionality of switching system manager (108). The processor may be a hardware processor including circuitry such as, for example, a central processing unit or a microcontroller. The processor may be other types of hardware devices for processing digital information without departing from the embodiments disclosed herein.

Switching system manager (108) may perform all, or a portion, of the method illustrated in FIG. 2 as part of providing its functionality.

When performing its functionality, switching system manager (108) may utilize data structures stored in storage (110).

In one or more embodiments disclosed herein, storage (110) is implemented using devices that provide data storage services (e.g., storing data and providing copies of previously stored data). The devices that provide data storage services may include hardware devices and/or logical devices. For example, storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, storage (110) may include a memory device (e.g., a dual in line memory device) in which data is stored and from which copies of previously stored data are provided. In another example, storage (110) may include a persistent storage device (e.g., a solid state disk drive) in which data is stored and from which copies of previously stored data is provided. In a still further example, storage (110) may include a memory device (e.g., a dual in line memory device) in which data is stored and from which copies of previously stored data are obtained and a persistent storage device that stores a copy of the data stored in the memory device (e.g., to provide a copy of the data in the event that power loss or other issues with the memory device that may impact its ability to maintain the copy of the data cause the memory device to lose the data).

Storage (110) may store data structures including, for example, switching system repository (112), lookup data (114), and/or rule data (116). Each of these data structures is discussed below.

Switching system repository (112) may be implemented using one or more data structures that store information that may be used to obtain lookup data (114) and/or rule data (116). The information may include, for example, information regarding the network environment in which network device (100) resides (e.g., information regarding ports (102), media access control addresses of devices operably connected to network device (100) via ports (102), media access control address internet protocol address bindings, higher level network information, etc.), traffic management policies to be implemented by network device (100) (e.g., segment security policies, subnet management policies, etc.), predetermined methods and/or modalities for programming programmable hardware (120), and/or other types of information. For additional details regarding switching system repository (112), refer to FIG. 1.4.

Lookup data (114) may be implemented using one or more data structures that store information that may be used to program and/or reprogram switching system (106). Lookup data (114) may include information usable to classify packets. For example, lookup data (114) may specify packet classifications based on control information included in packets. For additional details regarding lookup data, refer to FIG. 1.5.

Rule data (116) may be implemented using one or more data structures that store information that may be used to program and/or reprogram switching system (106). Lookup data (114) may include information usable to identify actions to be performed. For example, rule data (116) may specify actions to be performed based on (i) packet classification(s), (ii) control information of the packets, and/or (iii) other information (e.g., network device (100) operating state, network state, etc.).

While network device (100) of FIG. 1.2 has been illustrated as including a limited number of specific components, a network device in accordance with embodiments disclosed herein may include additional, fewer, and/or different components.

As discussed above, network device (100) may include a switching system. FIG. 1.3 shows a diagram of programmable hardware (120) of switching system (106) in accordance with one or more embodiments disclosed herein. Switching system (106) may facilitate switching of packets between any numbers of ports (102) based on the programming of programmable hardware (120). Programmable hardware (120) may include packet classification hardware (122) and rule implementation hardware (124).

Packet classification hardware (122) may be programmable for packet classification purposes. For example, packet classification hardware (122) may accept a list of increasingly specific addresses. The addresses may be specified using, for example, Classless Inter-Domain Routing (CIDR) notation by defining subsequently smaller and smaller sub-portions of all potentially addressable locations. Packet classification hardware (122) may match control information (e.g., source/destination internet protocol address) to these different portions of the potentially addressable locations. Each of these portions may be associated with corresponding labels or other indicators of classification(s) of the packets based on the matching.

Rule implementation hardware (124) may be programmable for action identification purposes. For example, rule implementation hardware (124) may accept lists of one or more pieces of criteria and corresponding action(s) to be performed when a packet meeting the criteria is received. The criteria may include, for example, labels for the packets obtained by packet classification hardware (122).

These portions of the programmable hardware (120) and/or other portions may form a packet processing pipeline that determines actions to be performed in response to packets. The actions may include, for example, forwarding packets to other devices, dropping packets, and/or performing other actions.

Packet classification hardware (122) and rule implementation hardware (124) may be programmed using lookup data and rule data, respectively. The lookup data and the rule data may be obtained based on information included in a switching system repository. A diagram of switching system repository (112) in accordance with embodiments disclosed herein is shown in FIG. 1.4.

Switching system repository (112) may include any number of traffic management policies (130) and policy inheritance rules (139).

Traffic management policies (130) may specify how packets are to be processed. Specifically, traffic management policies (130) may specify the actions to be performed when different packets are received. Switching system repository (112) may include any number of traffic management policies (130).

Some, or all, of traffic management policies (e.g., 132, 138) may include packet classification rules (134) and conditional actions (136).

Packet classification rules (134) may specify how packets having predetermined control information are to be classified. Conditional actions (136) may specify actions to be performed when packets having, in part, corresponding classifications are received.

In one or more embodiments disclosed herein, packet classification rules (134) specify subsets (referred to as prefix, prefix range, or prefix set) of addressable network locations (e.g., internet protocol address ranges) and corresponding classifications (e.g., labels) associated with each of the subsets (e.g., prefix range, or prefix set) of the addressable network locations. Packet classification rules (134) may specify the subsets of addressable network locations using CIDR notation.

For example, packet classification rules (134) may specify a first subset as 10.1.0.0/16 (and corresponding classification of A1) and a second subset as 10.0.0.0/8 (and a corresponding classification of A2). When a packet is received that includes control information falling in the range 10.1.0.0/8 but not in 10.0.0.0/16, then the packet is to be classified as A2. When a second packet is received that includes control information falling in the range of both 10.1.0.0/8 and 10.0.0.0/16, then the packet is to be classified as A1 and A2.

While the subsets above have been explained with respect to inclusive terminology, a subset may be expressed using a combination of inclusive and exclusive terminology. For example, a subset may be expressed as 10.1.0.0/16 except 10.1.0.0/24.

In one or more embodiments disclosed herein, packet classification rules (134) also specify subsets based on associations with Virtual Routing and Forwarding (VRF) groups. For example, packet classification rules (134) may specify a first subset as 10.1.0.0/16 for a first VRF group (and corresponding classification of B1), a second subset as 10.0.0.0/9 for a second VRF group (and a corresponding classification of B2), and a third subset as 10.0.0.0/8 for the first VRF group (and a corresponding classification of B3). When a packet is received that includes control information falling in the range 10.0.0.0/8 but not in 10.1.0.0/16, then the packet is to be classified as B2 and B3. When a second packet is received that includes control information falling in the range of both 10.0.0.0/8 and 10.1.0.0/16, then the packet is to be classified as B1, B2, and B3.

In some embodiments disclosed herein, packet classification rules (134) may further specify that only a single label is to be applied for each VRF group. For example, in a longest prefix match application, the packet classification rules may further specify that each packet is only to receive a single classification for each VRF group. In such a scenario, taking into account the example set forth in the previous paragraph, when the second packet is received that includes control information falling in the range of both 10.0.0.0/8 and 10.1.0.0/16, then the second packet is to only be classified as B1 (the most specific match for the first VRF group) and B2. The second packet is not classified as B3 because it is associated with the same VRF group as the B1 classification and is less specific than the internet protocol address range associated with the B1 classification (i.e., 10.1.0.0/16 is more specific than 10.0.0.0/8). In other words, the longest prefix match for the second packet is B1 for internet protocol address ranges of 10.1.0.0/16 and 10.0.0.0/8.

Packet classification rules (134) may specify any number and type of classifications for packets without departing from embodiments disclosed herein.

Conditional action(s) (136) may specify any number of actions to be performed when packets having, in part, classifications specified by packet classification rules (134) are received. For example, one or more conditional action(s) may specify criteria that when met indicate that one or more actions are to be performed. The criteria may include, in part, that a packet receives a particular classification by packet classification rules (134).

Different traffic management policies may specify different packet classification rules and different conditional actions. As noted above, programmable hardware of switching systems may be programmed to implement traffic management policies (130).

To implement traffic management policies (132), switching system manager (108, FIG. 1.2) may obtain lookup data (114, FIG. 1.2) and/or rule data (116, FIG. 1.2). When doing so, switching system manager (108, FIG. 1.2) may generate lookup data and/or rule data using a predetermined (or dynamically selected) data structure. The use of the predetermined data structure may (i) reduce the quantity of resources of programmable hardware used to implement traffic management policies (132) and (ii) reduce the quantity of resources used when classifying packets.

The predetermined data structure may be a trie data structure. The trie data structure may include nodes that correspond to the subsets specified by at least two traffic management policies. In other words, the trie may be generated to enumerate all of the subsets of at least two traffic management policies. Consequently, the resulting trie may be usable to perform a combined lookup for two separate traffic management policies.

For example, if a first traffic management policy specifies a first subset as 10.1.0.0/16, a second traffic management policy specifies a second subset of 10.0.0.0/8, and the second traffic management policy also specifies a third subset of 10.1.0.0/24, then the trie may include three nodes where each node corresponds to a respective subset.

The trie may organize the nodes based on a specificity of each subset associated with the nodes. In the previous example, the nodes may be organized as 10.0.0.0/8->10.1.0.0/16->10.1.0.0/24 (least to most specific). By organizing the nodes in this manner, packets may be sequentially compared to nodes (from least to most specific) to efficiently identify to which subsets packets belong.

Policy inheritance rules (139) may be used to set labels associated with each node of a trie. By doing so, when a packet is matched to one or more nodes of the trie, corresponding labels (i.e., classifications) for the packet may be identified.

Policy inheritance rules (139) may specify different rules for different traffic management policies. Consequently, when a trie for multiple traffic management rules is generated, the resulting trie may be usable to obtain classifications for packets for multiple traffic management rules. In other words, performing a single lookup using the trie may provide labels corresponding to each of the multiple traffic management rules.

The rules of policy inheritance rules (139) corresponding to each traffic management policy may depend on the type of the traffic management policy. For example, some traffic management policies may specify that packets are to receive multiple classifications while other traffic management policies may specify that packets are only to receive a limited number of classifications. These classification rules may be predicated on the types of conditional actions implemented by the traffic management policies. Thus, for each type of traffic management policy, the policy inheritance rules (139) may specify corresponding rules that govern assignment of labels to each node of a trie.

In one or more embodiments disclosed herein, the policy inheritance rules (139) include at least two different sets of rules that correspond to two different traffic management policies. The first traffic management policy may allow for multiple classifications to be given to a packet for each VRF group while the second traffic management policy may only allow for a single classification for each VRF group.

The set of rules corresponding to the first traffic management policy may specify that (i) first, each node is associated with a label associated with a corresponding subset of the packet classification rules; (ii) second, each child node inherits all labels from its parent node that are (a) not already associated with the child node, and (b) the subset range associated with the child node falls within the subset range associated with the parent label; (iii) third, each unique combination of labels assigned to the nodes is transformed into an enumerated label space; and (iv) fourth, the nodes are relabeled based on the enumerated label space.

For example, consider a scenario where a first node is assigned the label A1, a second node is assigned the labels A1 and A2 (via inheritance in (ii), above paragraph), and a third node is assigned the label A1. In this scenario, the label space may be enumerated as label X (corresponding to A1) and label Y (corresponding to A1 and A2). The nodes are then relabeled as first node->label X; second node->label Y; third node->label X.

The set of rules corresponding to the second traffic management policy may specify that (i) first, each node is associated with a label associated with a corresponding subset of the packet classification rules; (ii) second, each child node inherits all labels from its parent node that are (a) not already associated with the child node, (b) associated with subset ranges that encompass the subset range associated with the child node, and (c) not associated with any VRF for which a label associated with the child node is associated; (iii) third, each child node provisionally inherits all labels from its parent node that (a) are not already associated with the child, (b) are associated with subset ranges that encompass the subset range associated with the child node, and (c) are associated with any VRF for which a label associated with the child node is associated; (iv) fourth, each child node inherits (as non-provisional label) all provisional labels from its parent node that (a) are not already associated with the child, (b) are associated with subset ranges that encompass the subset range associated with the child node, and (c) are not associated with any VRF for which any label associated with the child node is associated; (v) fifth, provisional labels are removed; (vi) sixth, each unique combination of labels assigned to the nodes is transformed into an enumerated label space; and (vii) seventh, the nodes are relabeled based on the enumerated label space. For additional details regarding use of the traffic management policies, refer to FIGS. 4.1-4.14.

The rules of policy inheritance rules (139) may include any type and quantity of inheritance rules that govern the classifications and corresponding labels assigned to trie structures. Any number of trie structures may be generated and aggregated as part of lookup data. To further clarify lookup data, FIG. 1.5 shows a diagram of lookup data (114) in accordance with embodiments disclosed herein.

Lookup data (114) may include any number of trie data structures (e.g., 140, 150). Each trie may have been generated with respect to one or more traffic management policies. Each trie may include prefix sets (142) and corresponding label allocations (144). As noted above, each trie may be arranged as a series of nodes with each node being associated with a corresponding prefix set that specifies a subset of addressable space.

Label allocations (144) may be associated with any number of label allocations (e.g., 146, 148) corresponding to different traffic management policies. The combination of prefix sets (142) and label allocations (144) may be organized as a trie where node of the trie specifies, at least, a tuple as <prefix, first traffic management policy label, second traffic management policy label>. However, the nodes of the trie may include additional labels (e.g., <prefix, traffic management policy label A . . . traffic management policy label N>) without departing from embodiments disclosed herein.

Different tries may be usable to identify classification labels for similar and/or different traffic management policies. For example, a first trie may be usable to, via a single lookup, identify a label associated with a first traffic management policy and a label associated with a second traffic management policy. A second trie may be usable to, via a single lookup, identify a label associated with the second traffic management policy and a label associated with a third traffic management policy.

As discussed above, a network device may use lookup data to forward packets by programming forwarding hardware using the lookup data. FIG. 2 shows a diagram of a method that may be used to program programmable hardware and FIG. 3 shows a diagram of method of processing packets using programmed programmable hardware in accordance with one or more embodiment disclosed herein.

FIG. 2 shows a flowchart describing a method for programming hardware in accordance with one or more embodiments disclosed herein. The method may be performed by, for example, a network device (e.g., 100, FIG. 1.2). Other entities may perform the method of FIG. 2 without departing from embodiments disclosed herein.

While the various steps in the flowchart shown in FIG. 2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 200, a first traffic management policy of a first type and a second traffic management policy of a second type are obtained. The traffic management policies may be obtained from, for example, an administrator, another entity (e.g., traffic management entity) or another source without departing from embodiments disclosed herein.

Each of the traffic management policies may be associated with different inheritance rules, discussed with respect to FIG. 1.4. Specifically, one of the traffic management policies may allow for multiple classifications per VRF group of packets (e.g., a multi-classification traffic management policy) while the other traffic management policy may only allow one traffic classification per VRF group of packets (e.g., a single-classification traffic management policy). For example, the first traffic management policy may be a security policy while the second traffic management policy may be a longest prefix match policy.

In step 202, a base lookup data structure including nodes that enumerate all prefixes of the first traffic management policy and the second traffic management policy is generated. The base lookup data structure may be organized as a trie comprising the nodes. The nodes of the base lookup data structure may be (i) ordered based on a specificity of a prefix associated with each respective node and (ii) be associated with a label corresponding to each traffic management policy.

For example, each node may be associated with a tuple of <prefix, label associated with first traffic management policy, label associated with second traffic management policy>.

In step 204, the base lookup data structure is modified by a first set of inheritance rules associated with the first traffic management policy to obtain an updated lookup data structure that includes first traffic management policy label allocations.

The base lookup structure may be modified by (i) performing inheritance of the existing labels assigned to each node and associated with the first traffic management policy using the first set of inheritance rules, (ii) enumerating the labels assigned to each node and associated with the first traffic management policy to obtain a first label space, and (iii) replacing the labels assigned to each node and associated with the first traffic management policy using the first label space.

For example, performing inheritance may modify each node to include a tuple as <prefix, one or more labels associated with the first traffic management policy, label associated with the second traffic management policy>. The label space may be obtained by enumerating the space defined by all unique combinations of the one or more labels associated with the first traffic management policy. The labels assigned to each node and associated with the first traffic management policy may be replaced using the label space resulting in nodes that include tuples as <prefix, label of label space associated with first traffic management policy, label associated with second traffic management policy>. The label of the label space associated with the first traffic management policy that is assigned to each node may be the first traffic management policy label allocations.

In step 206, the updated lookup data structure is modified based on a second set of inheritance rules associated with the second traffic management policy to obtain a combined lookup data structure that includes the first traffic management policy label allocations and second traffic management policy label allocations.

The updated lookup structure may be modified by (i) performing inheritance of the existing labels assigned to each node and associated with the second traffic management policy using the second set of inheritance rules, (ii) enumerating the labels assigned to each node and associated with the second traffic management policy to obtain a second label space, and (iii) replacing the labels assigned to each node and associated with the second traffic management policy using the second label space.

For example, performing inheritance may modify each node to include a tuple as <prefix, label of label space associated with first traffic management policy, one or more labels associated with the second traffic management policy>. The label space may be obtained by enumerating the space defined by all unique combinations of the one or more labels associated with the second traffic management policy. The labels assigned to each node and associated with the second traffic management policy may be replaced using the label space resulting in nodes that include tuples as <prefix, label of label space associated with first traffic management policy, label of label space associated with second traffic management policy. The label of the label space associated with the second traffic management policy that is assigned to each node may be the second traffic management policy label allocations.

In step 208, packet classification hardware of a switching system is programmed to cause the switching system to process packets based on the combined lookup data structure. For example, the packet classification hardware may be programmed to identify control information in packets that may be used to match to the prefix of each node of the combined lookup data structure, to traverse the combined lookup data structure to identify matching nodes, and classify the packets using the label allocations associated with the matched nodes.

The method may end following step 208.

Following step 208, a switching system may be capable of performing packet classification in accordance with traffic management policies when processing packets. To further clarify the process of processing packets using a switching system, a flowchart describing a method for processing packets in accordance with one or more embodiments disclosed herein is shown in FIG. 3. The method may be performed by, for example, a network device (e.g., 100, FIG. 1.2). Other entities may perform the method of FIG. 3 without departing from embodiments disclosed herein.

In step 300, a packet is obtained. The packet may be obtained from another device operably connected to the network device via a port. The port may be operably connected to a switching system which includes packet classification hardware for classifying packets.

In step 302, the packet is classified using a combined lookup data structure to obtain (i) a first label associated with a first traffic management policy and (ii) a second label associated with a second traffic management policy. The packet may be classified using packet classification hardware programmed using the combined lookup data structure. The combined lookup data structure may be implemented as a trie that provides, via a single lookup, the first label and the second label.

In step 304, the first label is matched to a first action set and the second label is matched to a second action set. The matching may be performed by a rule implementation hardware of a switching system of the network device. The rule implementation hardware may be programmed using rule data that specifies one or more actions (e.g., action sets) keyed, at least in part, to the first label and the second label.

The first action set and the second action set may include any number of actions including, for example, forwarding of the packet to another device, dropping the packet, notifying entities (e.g., applications, other devices, etc.) of the packet, and/or other actions that may be used to manage and/or operate a network environment.

In step 306, the first action set and the second action set are performed to process the packet. Performing the action sets may cause the network device to perform any number and type of actions. Performing these actions may cause the network device to provide communication services (e.g., packet forwarding) in accordance with traffic management policies.

The method may end following step 306.

To further clarify embodiments disclosed herein, an example in accordance with embodiments is provided in FIGS. 4.1-4.14. FIG. 4.1 shows a diagram of a traffic management policy for which a network device may generate a trie as part of lookup data. FIGS. 4.2-4.14 show diagrams illustrating a process of generating a trie based on the traffic management policy.

Example

Consider a scenario in which a network device is provided with two traffic management policies. The traffic management policies may include traffic classification rules, which need to be implemented by a network device. Each of the traffic management policies may be associated with different inheritance rules by virtue of their respective policy types. For example, one of the traffic management policies may implement a longest prefix match process while another traffic management policy may allow for packets to receive multiple classifications (e.g., the rules keyed to the classifications may be generated based on the fact that the packets will receive multiple classifications even for the same VRF group). These inheritance rules may be similar to those described with respect to FIG. 1.4.

For simplicity, consider a scenario in which both traffic management policies include the same traffic classification rules as set forth in FIG. 4.1. As seen in FIG. 4.1, packet classification rules (400) include three rules (402, 408, 414). Each of these rules includes a condition (e.g., 404, 410, 416) and a corresponding classification (e.g., 406, 412, 418).

Condition (404) of first classification rule (402) specifies that packets must be within 10.1.0.0/16 except for 10.1.0.0/24 and be a member of the first VRF group to receive first type classification (406). Condition (410) of second classification rule (408) specifies that packets must be within 10.0.0.0/8 and be a member of the first VRF group to receive second type classification (412). Condition (416) of third classification rule (414) specifies that packets must be within 10.0.0.0/9 and be a member of the second VRF group (416) to receive third type classification (418).

To generate a trie for these classification rules, turning to FIG. 4.2, a base trie is generated having five nodes (420, 422, 424, 426, 428) thereby providing nodes that enumerate all of the prefixes specified by the classification rules. The nodes include first node (420) as a base. Each of the remaining nodes (422, 424, 426, 428) are associated with corresponding prefixes of sequentially increasing specificity along with the respective classifications.

For example, second node (422) is associated with prefix 10.0.0.0/8, third node (424) is associated with 10.0.0.0/9, fourth node (426) is associated with 10.1.0.0/16, and fifth node (428) is associated with 10.1.0.0/24. By doing so, when a packet is received, its source or destination internet protocol address may be sequentially compared to the prefixes associated with the nodes starting with first node (420). The process may be repeated until the compared internet protocol address of a packet does not fall within the range specified by the corresponding prefix.

Similarly, second node (422) is associated with second type by virtue of its association specified by second classification rule (408), third type is associated with third node (424) by virtue of its association specified by third classification rule (414), and first type is associated with fourth node (426) by virtue of its association specified by first classification rule (402).

Turning to FIG. 4.3, after generating the base trie, the first inheritance rules are applied. As discussed with respect to FIG. 1.4, the first inheritance rules allow for inheritance from parent nodes regardless of whether a node is already associated with a classification for a particular VRF group.

Starting at second node (422), its parent (e.g., 420) is not associated with any classification. Consequently, it does not inherit any classifications from the parent node.

Moving to third node (424), its parent (e.g., 422) is associated with second type. Consequently, it inherits second type as indicated by the arrow from "second type" to "second type" (similar arrows and text are used throughout FIGS. 4.4-4.14 to illustrate inheritance) because (i) third node (424) is not already associated with second type and the prefix associated with third node (424) falls within the range specified by the prefix associated with second type.

Turning to FIG. 4.4 and moving to fourth node (426), its parent (e.g., 424) is associated with both third type and second type. Consequently, it inherits second type and third type because (i) fourth node (426) is not already associated with second type or third type and the prefix associated with fourth node (426) falls within the range specified by the prefixes associated with second type and third type, respectively.

Turning to FIG. 4.5 and moving to fifth node (428), its parent (e.g., 426) is associated with first type, second type, and third type. Fifth node (428) is also not already associated with the prefixes associated with first type, second type, or third type. However, the prefix associated with fifth node (428) falls outside of the range of the prefix associated with first type.

For example, the prefix associated with first type is 10.1.0.0/16 except 10.1.0.0/24 which explicitly excludes the prefix 10.1.0.0/24 associated with fifth node (428). Consequently, fifth node (428) inherits second type and third type but not first type.

At this point, inheritance for the first traffic management policy is complete and the classification space may be enumerated. As seen in FIG. 4.5, there are now three unique groups of labels applied to the nodes, namely: group 1—second type, group 2—second type and third type, and group 3—first type, second type, and third type. Based on these groupings, a label space of three labels is generated and these label groupings are replaced with the labels corresponding to the label space for the first traffic management policy as seen in FIG. 4.6.

After these labels are obtained, labels for the second traffic management policy are obtained. To do so, the process illustrated in FIGS. 4.2-4.6 is repeated but uses different inheritance rules. This process may be performed in a sequential, partially overlapping in time manner, or in parallel to the process illustrated in FIGS. 4.2-4.6. Turning to FIG. 4.7, the process begins with the same base trie as shown with respect to FIG. 4.2 because the trie includes nodes corresponding to all of the prefixes specified by both traffic management policies. Similarly, for simplicity, the same classifications rules and corresponding classifications are used to illustrate how different inheritance rules may impact the resulting label distributions.

Turning to FIG. 4.8 and starting at second node (422), its parent (e.g., 420) is not associated with any classification. Consequently, it does not inherit any classifications from the parent node.

Moving to third node (424), its parent (e.g., 422) is associated with second type. Consequently, it inherits second type because (i) third node (424) is not already associated with second type, (ii) the prefix associated with third node (424) falls within the range specified by the prefix associated with second type, and (iii) third node (424) is not already associated with any prefix that is associated with the same VRF as second type. For example, as seen from FIG. 4.1, second type is associated with first VRF group while third type is associated with second VRF group. Thus, third node (424) inherits second type.

Turning to FIG. 4.9 and moving to fourth node (426), its parent (e.g., 424) is associated with both third type and second type but is already associated with first type which is associated with first VRF group (as seen in first classification rule (402)). Consequently, it inherits third type because (i) fourth node (426) is not already associated with third type, (ii) the prefix associated with third node (426) falls within the range specified by the prefix associated with third type, and (iii) fourth node (426) is not already associated with any prefix that is associated with the same VRF as third type. However, fourth node (426) only provisionally inherits second type because (i) fourth node (426) is not already associated with second type, (ii) the prefix associated with fourth node (426) falls within the range specified by the prefix associated with second type, and (iii) fourth node (426) is already associated with any prefix that is associated with the same VRF as third type (i.e., first type and second type are associated with the same prefix).

Turning to FIG. 4.10 and moving to fifth node (428), its parent (e.g., 426) is associated with first type, second type, and provisional third type and fifth node is not associated with any classifications. However, the prefix associated with fifth node (428) falls outside of the range of the prefix associated with first type. Consequently, it does not inherit first type.

In contrast, (i) fifth node (428) is not already associated with third type, (ii) the prefix associated with fifth node (428) falls within the range specified by the prefix associated with third type, and (iii) fifth node (428) is not already associated with any prefix that is associated with the same VRF as third type. Similarly, (i) fifth node (428) is not already associated with second type, (ii) the prefix associated with fifth node (428) falls within the range specified by the prefix associated with second type, and (iii) fifth node (428) is not already associated with any prefix that is associated with the same VRF as second type. Consequently, as illustrated in FIGS. 4.10 and 4.11, fifth node (428) inherits both third type and second type. This completes inheritance.

After inheritance is complete, provisional classifications are removed as illustrated in FIG. 4.12. As seen in FIG. 4.12, there are now three unique groups of labels applied to the nodes, namely: group 1—second type, group 2—second type and third type, and group 3—first type and third type. Based on these groupings, a label space of three labels is generated and these label groupings are replaced with the labels corresponding to the label space for the second traffic management policy as seen in FIG. 4.13.

After these labels are obtained, the final trie is obtained as illustrated in FIG. 4.14. As seen in FIG. 4.14, the trie includes nodes (422, 424, 426, 428) associated with tuples of <prefix, label for first policy, label for second policy>. Consequently, when a packet is obtained, it may be classified for both traffic management policies using a single lookup via this trie. These labels may then be used to identify actions set to perform to process the packet.

After obtaining the trie, the trie (and/or other tries/data structures) may be programmed into programmable hardware of a switching system thereby causing a network device to automatically process packets in accordance with the traffic management policies.

End of Example

As discussed above, a system in accordance with embodiments disclosed herein may include different types of devices including, for example, network devices. In one or more embodiments disclosed herein, a network device is a physical device that includes and/or is operably connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 22, FIG. 1.1) include, but are not limited to, a network switch, a router, a multilayer switch, a fiber channel device, an InfiniBand® device, etc. A network device (e.g., 22, FIG. 1.1) is not limited to the aforementioned specific examples.

In one or more embodiments disclosed herein, a network device (e.g., 22, FIG. 1.1) includes functionality to receive packets (e.g., frames, packets, tunneling protocol frames, etc.) at any of the physical network interfaces (i.e., ports) of the network device (e.g., 22, FIG. 1.1) and to process the packets. In one or more embodiments, processing a packet includes, but is not limited to, a series of one or more table lookups (e.g., longest prefix match (LPM) lookups, forwarding information lookups, etc.) and corresponding actions (e.g., forward from a certain port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop packets); (ii) whether to mirror the packets; and/or (iii) determine how to route/forward packets in order to transmit the packets from an interface (e.g., out of a port) of the network device (e.g., 22, FIG. 1.1). The switching system (106) of FIG. 1.2 may perform all, or a portion, of the pipeline processing.

In one or more embodiments disclosed herein, a network device (e.g., 22, FIG. 1.1) also includes and/or is operably connected to device storage and/or device memory (i.e., non-transitory computer readable mediums used to provide persistent storage resources and/or memory resources) storing software and/or firmware.

Such software and/or firmware may include instructions which, when executed by the one or more processors of a network device (e.g., 22, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 22, FIG. 1.1) is part of a network (e.g., 20, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network devices (e.g., 22, FIG. 1.1)) that facilitate network connectivity for one or more operably connected devices (e.g., computing devices, data storage devices, other network devices, etc.). In one or more embodiments, the network device (e.g., 22, FIG. 1.1) and other devices within and/or connected to the network (e.g., 20, FIG. 1.1) are arranged in a network topology. In one or more embodiments, a network topology is an arrangement of various elements of a network and/or devices that obtain services from the network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

Figure 5:
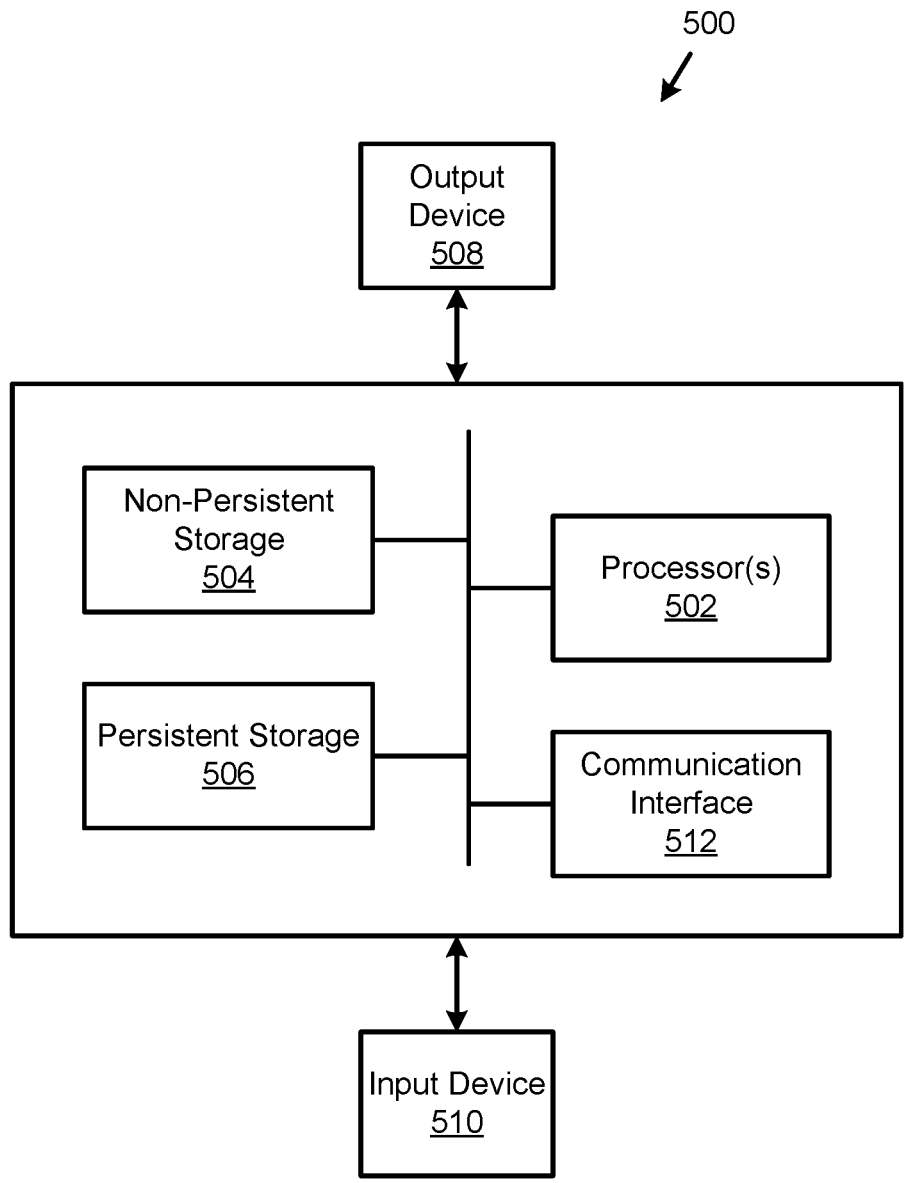
FIG. 5 shows a diagram of a computing device in accordance with one or more embodiments disclosed herein.

FIG. 5 shows a diagram of a computing device in accordance with one or more embodiments disclosed herein. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment disclosed herein, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments disclosed herein may provide a network device and/or method that provide packets switching services that conform to traffic management policies. For example, embodiments disclosed herein may provide a network device that programs programmable hardware for packet processing in a manner that efficiently utilizes the limited resources of the programmable hardware. By doing so, a network device may implement more complicated traffic management policies and/or may more quickly process packets.

Thus, embodiments disclosed herein may address the problem of limited resources for performing packet processing in a network.

While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope of embodiments described herein should be limited only by the attached claims.

What is claimed is:

1. A method of processing packets by a network device of a network topology, comprising:
    obtaining, at a network device including packet processing hardware, a base lookup data structure comprising nodes that enumerate all prefixes of at least two traffic management policies;
    modifying the base lookup data structure to generate a combined lookup data structure configured to provide packet classifications for each of the at least two traffic management policies via a single lookup in the combined lookup data structure, and
    programming the network device to process packets in accordance with the at least two traffic management policies based on the single lookup by programming the packet classification hardware of the network device according to the combined lookup data structure.

2. The method of claim 1, further comprising:
    obtaining a packet of the packets;
    classifying, using the programmed packet classification hardware, the packet using the combined lookup data structure to obtain:
    a first label for a first traffic management policy of the traffic management policies, and
    a second label for a second traffic management policy of the at least two traffic management policies;
    matching the first label to a first action set;
    matching the second label to a second action set; and
    performing the first action set and the second action set to process the packet.

3. The method of claim 2, wherein the combined lookup data structure comprises a trie comprising nodes.

4. The method of claim 3, wherein the nodes are sequentially ordered based on a specificity level of the prefixes associated with each respective node.

5. The method of claim 3, wherein classifying the packet using the combined lookup data structure comprises:
    obtaining a portion of control information of the packet;
    sequentially walking the nodes until a most specific match between the portion of the control information and a prefix associated with one of the nodes is made; and
    using labels associated with the one of the matched nodes as the packet classification.

6. A network device, comprising:
    a switching system configured to process packets, comprising:
    packet classification hardware; and
    a switching system manager programmed to:
    obtain a base lookup data structure comprising nodes that enumerate all prefixes of a first traffic management policy of a first type and all prefixes of a second traffic management policy of a second type;
    modify the base lookup data structure based on a first set of inheritance rules associated with the first traffic management policy to generate an updated lookup data structure comprising first traffic management policy label allocations; and
    modify the updated lookup data structure based on a second set of inheritance rules associated with the second traffic management policy to generate a combined lookup data structure comprising the first traffic management policy label allocations and second traffic management policy label allocations,
    wherein the switching system is configured to process packets in accordance with both the first traffic management policy and the second traffic management policy based on a single lookup by programming the packet classification hardware according to the combined lookup data structure.

7. The network device of claim 6, wherein the switching system is adapted to, after the packet classification hardware is programmed:
    obtain a packet of the packets;
    classify, using the programmed packet classification hardware, the packet using the combined lookup data structure to obtain:
    a first label of the first traffic management policy label allocations, and
    a second label of the second traffic management policy label allocations;
    match the first label to a first action set;
    match the second label to a second action set; and
    process the packet by performing the first action set and the second action set.

8. The network device of claim 7, wherein the combined lookup data structure comprises a trie comprising nodes.

9. The network device of claim 8, wherein the nodes are sequentially ordered based on a specificity level of the prefixes associated with each respective node.

10. The network device of claim 9, wherein classifying the packet using the combined lookup data structure comprises:
    obtaining a portion of control information of the packet;

sequentially walking the nodes until a most specific match between the portion of the control information and a prefix associated with one of the nodes is made; and using labels associated with the one of the matched nodes as the packet classification.

11. The network device of claim 8, wherein each of the nodes is associated with a respective label of the first traffic management policy label allocations and a respective label of the second traffic management policy label allocations.

12. The network device of claim 8, wherein the first set of inheritance rules is more likely to result in inheritance from a parent node of the nodes to a child node of the nodes than the second set of inheritance rules.

13. The network device of claim 12, wherein the first traffic management policy allows multi-prefix matching of packet control information.

14. The network device of claim 12, wherein the second traffic management policy requires single-prefix matching of packet control information.

15. The network device of claim 6, wherein second traffic management policy comprises longest prefix match.

16. The network device of claim 6, wherein the programmed packet classification hardware is adapted to provide classifications for both the first traffic management policy and the second traffic management policy via a single lookup in the combined lookup data structure.

17. A non-transitory computer readable medium comprising computer readable program code, which when executed by a computer processor enables the computer processor to perform a method for forwarding packets by a network device of a network topology, the method comprising:

generating, at a network device including packet processing hardware, a combined lookup data structure, based on at least two traffic management policies, wherein the combined lookup data structure is configured to provide packet classifications for each of the at least two traffic management policies via a single lookup in the combined lookup data structure, and programming the network device is configured to process packets in accordance with both the at least two traffic management policies based on the single lookup by programming the packet classification hardware of the network device according to the combined lookup data structure.

18. The non-transitory computer readable medium of claim 17, wherein the method further comprises:

obtaining a packet of the packets;

classifying, using the programmed packet classification hardware, the packet using the combined lookup data structure to obtain:

a first label for a first traffic management policy of the at least two traffic management policies, and a second label for a second traffic management policy of the at least two traffic management policies;

matching the first label to a first action set;

matching the second label to a second action set; and performing the first action set and the second action set to process the packet.

19. The non-transitory computer readable medium of claim 18, wherein the combined lookup data structure comprises a trie comprising nodes that enumerate all prefixes of the at least two traffic management policies.

20. The non-transitory computer readable medium of claim 19, wherein the nodes are sequentially ordered based on a specificity level of the prefixes associated with each respective node.

* * * * *